United States Patent
Lewis et al.

(10) Patent No.: US 11,572,433 B2
(45) Date of Patent: Feb. 7, 2023

(54) IN-SITU FORMED POLYOLS, A PROCESS FOR THEIR PREPARATION, FOAMS PREPARED FROM THESE IN-SITU FORMED POLYOLS AND A PROCESS FOR THEIR PREPARATION

(71) Applicant: Covestro LLC, Pittsburgh, PA (US)

(72) Inventors: Sharlene A. Lewis, Pittsburgh, PA (US); Jack R. Reese, Coraopolis, PA (US); Nigel Barksby, Moon Township, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 218 days.

(21) Appl. No.: 17/199,594

(22) Filed: Mar. 12, 2021

(65) Prior Publication Data
US 2022/0289897 A1   Sep. 15, 2022

(51) Int. Cl.
*C08G 18/28* (2006.01)
*C08G 18/30* (2006.01)
*C08G 18/48* (2006.01)
*C08G 18/76* (2006.01)
*C08G 65/26* (2006.01)
*C08G 101/00* (2006.01)

(52) U.S. Cl.
CPC ....... *C08G 18/4854* (2013.01); *C08G 18/302* (2013.01); *C08G 18/7621* (2013.01); *C08G 65/2609* (2013.01); *C08G 65/2663* (2013.01); *C08G 65/2696* (2013.01); *C08G 2101/00* (2013.01); *C08G 2110/0008* (2021.01); *C08G 2110/0058* (2021.01)

(58) Field of Classification Search
CPC ................................................. C08G 65/2606
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,404,109 A | 10/1968 | Milgrom |
| 3,405,077 A | 10/1968 | Pastor et al. |
| 3,427,334 A | 2/1969 | Belner |
| 3,433,752 A | 3/1969 | Collins et al. |
| 3,454,504 A | 7/1969 | Murai et al. |
| 3,523,093 A | 8/1970 | Stamberger et al. |
| 3,538,043 A | 11/1970 | Herold |
| 3,652,639 A | 3/1972 | Pizzini et al. |
| 3,823,201 A | 7/1974 | Pizzini et al. |
| 3,875,086 A | 4/1975 | Ramey et al. |
| 3,900,518 A | 8/1975 | Milgrom |
| RE28,715 E | 2/1976 | Stamberger |
| 3,941,849 A | 3/1976 | Herold |
| 3,946,466 A | 3/1976 | Sakai et al. |
| RE29,118 E | 1/1977 | Stamberger |
| 4,089,835 A | 5/1978 | Konig et al. |
| 4,104,236 A | 8/1978 | Simroth |
| 4,111,865 A | 9/1978 | Seefried, Jr. et al. |
| 4,119,586 A | 10/1978 | Shah |
| 4,125,505 A | 11/1978 | Critchfield et al. |
| 4,148,840 A | 4/1979 | Shah |
| 4,172,825 A | 10/1979 | Shook et al. |
| 4,209,593 A | 6/1980 | Khanna |
| 4,260,530 A | 4/1981 | Reischl et al. |
| 4,324,715 A | 4/1982 | Emerick |
| 4,367,259 A | 1/1983 | Fulmer et al. |
| 4,374,209 A | 2/1983 | Rowlands |
| 4,438,001 A | 3/1984 | Suzuki et al. |
| 4,472,560 A | 9/1984 | Kuyper et al. |
| 4,477,589 A | 10/1984 | van der Hulst et al. |
| 4,524,157 A | 6/1985 | Stamberger |
| 4,565,196 A | 1/1986 | Melby et al. |
| 4,656,196 A | 4/1987 | Kelly et al. |
| 4,670,477 A | 6/1987 | Kelly et al. |
| 4,690,956 A | 9/1987 | Ramlow et al. |
| 4,722,946 A | 2/1988 | Hostettler et al. |
| 4,764,541 A | 8/1988 | Brasington et al. |
| 4,785,027 A | 11/1988 | Brasington et al. |
| 4,826,953 A | 5/1989 | Kuyper et al. |
| 4,839,397 A | 6/1989 | Lohmar et al. |
| 4,850,694 A | 7/1989 | Severinsson et al. |
| 4,862,952 A | 9/1989 | Tarasewich et al. |
| 4,950,694 A | 8/1990 | Hager et al. |
| 4,950,695 A | 8/1990 | Stone |
| 4,950,965 A | 8/1990 | Kenny et al. |
| 4,963,637 A | 10/1990 | Barksby |
| 4,980,386 A | 12/1990 | Tiao et al. |
| 4,981,880 A | 1/1991 | Lehmann et al. |

(Continued)

FOREIGN PATENT DOCUMENTS

JP      3992869 B2   10/2007

OTHER PUBLICATIONS

Jones, R.E. and Fesman, G.; "Journal of Cellular Plastics"; Jan. 1965, vol. 1, pp. 200-216; Air Flow Measurement and its Relations to Cell Structure, Physical Properties, and Processibility for Flexible Urethane Foam.

*Primary Examiner* — Melissa A Rioja

(74) *Attorney, Agent, or Firm* — Donald R. Palladino

(57) ABSTRACT

This invention relates to an in-situ formed polyol blend having an overall functionality of 2 to 3 and an overall hydroxyl number of 50 to 150. A process for preparing these polyol blends is also disclosed. These in-situ formed polyol blends are suitable for preparing viscoelastic flexible polyurethane foams. A process for preparing these foams is also disclosed.

19 Claims, No Drawings

(56) References Cited

U.S. PATENT DOCUMENTS

| | | |
|---|---|---|
| 4,987,156 A | 1/1991 | Tozune et al. |
| 5,011,908 A | 4/1991 | Hager |
| 5,114,619 A | 5/1992 | Heuvelsland |
| 5,145,883 A | 9/1992 | Saito et al. |
| 5,152,922 A | 10/1992 | Meyer et al. |
| 5,158,922 A | 10/1992 | Hinney et al. |
| 5,171,759 A | 12/1992 | Hager |
| 5,292,778 A | 3/1994 | Van Veen et al. |
| 5,321,077 A | 6/1994 | Hayes et al. |
| 5,358,984 A | 10/1994 | Hayes et al. |
| 5,364,906 A | 11/1994 | Critchfield et al. |
| 5,420,170 A | 5/1995 | Lutter et al. |
| 5,453,469 A | 9/1995 | Yezrielev et al. |
| 5,470,813 A | 11/1995 | Le-Khac |
| 5,482,908 A | 1/1996 | Le-Khak |
| 5,488,085 A | 1/1996 | Hayes et al. |
| 5,489,618 A | 2/1996 | Gerkin |
| 5,496,894 A | 3/1996 | Critchfield et al. |
| 5,539,011 A | 7/1996 | Hilker et al. |
| 5,544,662 A | 8/1996 | Saulnier et al. |
| 5,554,662 A | 9/1996 | Sanders et al. |
| 5,594,066 A | 1/1997 | Heinemann et al. |
| 5,605,939 A | 2/1997 | Hager et al. |
| 5,631,319 A | 5/1997 | Reese et al. |
| 5,670,601 A | 9/1997 | Allen et al. |
| 5,689,012 A | 11/1997 | Pazos et al. |
| 5,777,177 A | 7/1998 | Pazos |
| 5,814,699 A | 9/1998 | Kratz et al. |
| 5,824,712 A | 10/1998 | Willkomm et al. |
| 5,916,994 A | 6/1999 | Izukawa et al. |
| 5,919,395 A | 7/1999 | Bastin et al. |
| 5,919,988 A | 7/1999 | Pazos et al. |
| 5,990,185 A | 11/1999 | Fogg |
| 5,995,534 A | 11/1999 | Fullerton et al. |
| 6,034,145 A | 3/2000 | Cornet et al. |
| 6,034,197 A | 3/2000 | Mahon et al. |
| 6,043,290 A | 3/2000 | Petrella |
| 6,046,249 A | 4/2000 | Tobias et al. |
| 6,063,309 A | 5/2000 | Hager et al. |
| 6,066,683 A | 5/2000 | Beisner et al. |
| 6,117,937 A | 9/2000 | Matsumoto et al. |
| 6,136,879 A | 10/2000 | Nishida et al. |
| 6,218,444 B1 | 4/2001 | Hager et al. |
| 6,387,972 B1 | 5/2002 | Ghobary et al. |
| 6,391,395 B1 | 5/2002 | Tseng et al. |
| 6,391,820 B1 | 5/2002 | Ooms et al. |
| 6,391,933 B1 | 5/2002 | Mattesky |
| 6,395,796 B1 | 5/2002 | Ghobary et al. |
| 6,455,603 B1 | 9/2002 | Fogg |
| 6,472,447 B1 | 10/2002 | Lorenz et al. |
| 6,491,846 B1 | 12/2002 | Reese, II et al. |
| 6,521,674 B1 | 2/2003 | Haley et al. |
| 6,624,209 B2 | 9/2003 | Kawamoto et al. |
| 6,638,986 B2 | 10/2003 | Faulke et al. |
| 6,660,781 B1 | 12/2003 | Ghobary et al. |
| 6,713,599 B1 | 3/2004 | Hinz et al. |
| 6,756,114 B2 | 6/2004 | Cichocki et al. |
| 6,756,414 B2 | 6/2004 | Kawamoto et al. |
| 6,762,214 B1 | 7/2004 | Tracy et al. |
| 6,818,675 B2 | 11/2004 | Ghobary et al. |
| 6,821,308 B2 | 11/2004 | Combs et al. |
| 6,838,516 B2 | 1/2005 | Dai et al. |
| 6,884,825 B2 | 4/2005 | Daunch et al. |
| 7,051,389 B2 | 5/2006 | Wassilefky |
| 7,078,443 B2 | 7/2006 | Milliren |
| 7,179,882 B2 | 2/2007 | Guelcher et al. |
| 7,415,742 B2 | 8/2008 | Wassilefky |
| 7,469,437 B2 | 12/2008 | Mikkelsen et al. |
| 7,530,127 B2 | 5/2009 | Leifermann et al. |
| 7,735,169 B2 | 6/2010 | Wassilefky |
| 7,754,809 B2 | 7/2010 | Stollmaier et al. |
| 7,759,423 B2 | 7/2010 | Chauk |
| 7,773,800 B2 | 8/2010 | Liu |
| 7,828,991 B2 | 11/2010 | Reese et al. |
| 7,968,754 B2 | 6/2011 | Ostrowski et al. |
| 7,977,501 B2 | 7/2011 | Shen et al. |
| 8,134,022 B2 | 3/2012 | Shen et al. |
| 8,232,364 B2 | 7/2012 | Hoffman et al. |
| 8,242,184 B2 | 8/2012 | Sasaki et al. |
| 8,268,906 B2 | 9/2012 | Sasaki et al. |
| 8,318,823 B2 | 11/2012 | Triouleyre et al. |
| 8,324,419 B2 | 12/2012 | Mijolovic et al. |
| 8,357,730 B2 | 1/2013 | Sasaki et al. |
| 8,418,297 B2 | 4/2013 | Collins et al. |
| 8,436,064 B2 | 5/2013 | Brown et al. |
| 8,487,015 B2 | 7/2013 | Sasaki et al. |
| 8,541,479 B2 | 9/2013 | Sasaki et al. |
| 8,642,668 B2 | 2/2014 | Sasaki et al. |
| 8,653,221 B2 | 2/2014 | Schuemann et al. |
| 8,656,537 B2 | 2/2014 | Leifermann et al. |
| 8,975,306 B2 | 3/2015 | Milliren |
| 8,975,335 B2 | 3/2015 | Hager et al. |
| 9,023,907 B2 | 5/2015 | Frei et al. |
| 9,029,432 B2 * | 5/2015 | Aou ............. C08G 18/4816 521/170 |
| 9,062,174 B2 | 6/2015 | Smiecinski |
| 9,133,298 B2 | 9/2015 | Hager et al. |
| 9,249,259 B2 | 2/2016 | Müller et al. |
| 9,255,174 B2 | 2/2016 | Aou et al. |
| 9,266,996 B2 | 2/2016 | Obi et al. |
| 9,376,526 B2 | 6/2016 | Hager et al. |
| 9,512,258 B2 | 12/2016 | Franceschin et al. |
| 9,593,199 B2 | 3/2017 | Wamprecht et al. |
| 9,790,314 B2 | 10/2017 | Zhao et al. |
| 9,856,355 B2 | 1/2018 | Bender et al. |
| 9,951,174 B2 | 4/2018 | Hager et al. |
| 10,662,277 B2 | 5/2020 | Okiyama et al. |
| 10,766,998 B2 | 9/2020 | Barksby et al. |
| 10,793,692 B2 | 10/2020 | Barksby et al. |
| 2007/0299153 A1 | 12/2007 | Hager et al. |
| 2011/0275732 A1 | 11/2011 | Bruchmann et al. |
| 2012/0202908 A1 | 8/2012 | Sasaki et al. |
| 2012/0238656 A1 | 9/2012 | De Kesel |
| 2013/0030068 A1 | 1/2013 | Sasaki et al. |
| 2013/0289150 A1 | 10/2013 | Hager et al. |
| 2016/0025078 A1 | 9/2016 | Murata et al. |
| 2017/0306076 A1 | 10/2017 | Adkins et al. |
| 2018/0237578 A1 | 8/2018 | McVey et al. |
| 2018/0265624 A1 | 9/2018 | Barksby et al. |
| 2019/0153148 A1 * | 5/2019 | Barksby ............. C08G 18/4866 |

* cited by examiner

IN-SITU FORMED POLYOLS, A PROCESS FOR THEIR PREPARATION, FOAMS PREPARED FROM THESE IN-SITU FORMED POLYOLS AND A PROCESS FOR THEIR PREPARATION

FIELD

The invention relates to novel in-situ formed polyol blends, a process for preparing these novel in-situ formed polyol blends, viscoelastic flexible polyurethane foams comprising these in-situ formed polyol blends, and a process for preparing these viscoelastic polyurethane foams from these in-situ formed polyol blends. The novel in-situ formed polyol blends provide simpler formulation processes by eliminating the need for blending two or more polyols while maintaining good physical properties in foams comprising these in-situ formed polyol blends.

BACKGROUND

In-situ formed polyol blends are important and/or highly desirable because they eliminate the need to blend two or more polyols. This helps to simplify formulation processes and also makes polyol blend formulations accessible when there is no capacity to separately store and/or blend together individual components. Foams prepared from these in-situ formed blends maintain good physical properties.

The popularity of viscoelastic polyurethane foam, also referred to as memory foam or low resilience foam, has significantly increased in recent years as pillows, toppers or layers in mattresses and bed in a box foams. It is also used in other home and office furnishings as well as automotive applications. This increased use has created a demand for better quality viscoelastic foams with high air flows and improved physical properties such as reduced compression sets and better tear strength.

SUMMARY

The novel in-situ formed polyol blends have an overall functionality of 2 to 3 and an overall hydroxyl number of 50 to 150. These polyol blends comprise:

(a) a monol initiated oxyalkylene ether having a hydroxyl number of less than or equal to 56, and containing less than or equal to 20% by weight of copolymerized oxyethylene, based on the total weight of monol initiated oxyalkylene ether (a), (b) a polyether polyol having a hydroxyl number of 80 to 220, a nominal functionality of 2, and containing from 5 to 45% by weight of copolymerized oxyethylene, based on the total weight of polyether polyol (b), (c) a polyether polyol having a hydroxyl number of 80 to 220, a nominal functionality of greater than 2 to 8, and containing from 5 to 45% by weight of copolymerized oxyethylene, based on the total weight of polyether polyol (c), and (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d); wherein the in-situ formed polyol blend comprises from 10 to 40% by weight of (a) the monol initiated oxyalkylene ether, from 10 to 30% by weight of (b) the polyether polyol, from 20 to 65% by weight of (c) the polyether polyol, and from 5 to 20% by weight of (d) the polyether polyol, with the sum of the %'s by weight of components (a), (b), (c) and (d) totaling 100% by weight of the in-situ formed polyol blend.

The process of preparing the in-situ formed polyol blend having an overall functionality of 2 to 3, and an overall hydroxyl number of 50 to 150, comprises:

I) introducing into a reaction vessel a mixture comprising:
  (1) an initially charged starter ($S_i$) comprising a monofunctional compound having a hydroxyl number of less than or equal to 80, and
  (2) a DMC (double metal cyanide) catalyst;

II) feeding
  (1) an epoxide comprising propylene oxide and ethylene oxide in a weight ratio of 100:0 to 80:20, into the reaction vessel;

III) allowing the epoxide mixture and the initially charged starter ($S_i$) to react and to polymerize by feeding the epoxide until the equivalent weight of the monofunctional compound is increased by at least 10% by weight and reaches a value between 1,500 and 6,000;

IV) continuously adding
  (1) a low equivalent weight continuously added starter ($S_c$) having a nominal functionality of greater than 2 to 6, and an equivalent weight of 28 to 400 into the reaction vessel while continuing to feed epoxide;

V) completing addition of the low equivalent weight continuously added starter ($S_c$);

VI) allowing the mixture to continue to polymerize in the reaction vessel thereby forming
  (1) an intermediate in-situ formed polyol blend which has an overall hydroxyl number of 50 to 150, an overall functionality of 2 to 3, and which comprises
    (a) a monol initiated oxyalkylene ether having a hydroxyl number of less than or equal to 56, and containing less than or equal to 20% by weight of copolymerized oxyethylene, based on 100% by weight of (a),
    (b) a polyether polyol having a hydroxyl number of 80 to 220, a nominal functionality of 2 and containing from 5 to 45% by weight of copolymerized oxyethylene, based on the total weight of the polyether polyol (b), and
    (c) a polyether polyol having a hydroxyl number of 80 to 220, a nominal functionality of greater than 2 to 8, and containing from 5 to 45% by weight of copolymerized oxyethylene, based on the total weight of the polyether polyol (c);

VII) feeding
  (1) an epoxide comprising propylene oxide while continuously adding
  (2) a low equivalent weight continuously added starter ($S_c$) having a nominal functionality of 2 to 8, and an equivalent weight of 28 to 400 into the reaction vessel;

VIII) completing addition of the low equivalent weight continuously added starter ($S_c$) and epoxide thereby forming in addition to (a), (b) and (c);
  (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d); wherein the in-situ formed polyol blend comprises from 10 to 40% by weight of (a) the monol initiated oxyalkylene ether, from 10 to 30% by weight of (b) the polyether polyol, from 20 to 65% by weight of (c) the polyether polyol, and from 5 to 20% by weight of (d) the polyether polyol, with the sum of the %'s by weight of components (a), (b), (c) and (d) totaling 100% by weight of the in-situ formed polyol blend.

The process of preparing the viscoelastic flexible polyurethane foams comprises reacting:

(A) a diisocyanate and/or polyisocyanate component,
(B) an isocyanate-reactive component comprising:
  (1) an in-situ formed polyol blend having an overall functionality of 2 to 3, an overall hydroxyl number of 50 to 150, which comprises:
    (a) a monol initiated oxyalkylene ether having a hydroxyl number of less than or equal to 56, and containing less than or equal to 20% by weight of copolymerized oxyethylene, based on the total weight of monol initiated oxyalkylene ether (a),
    (b) a polyether polyol having a hydroxyl number of 80 to 220, a nominal functionality of 2, and containing from 5 to 45% by weight of copolymerized oxyethylene, based on the total weight of polyether polyol (b),
    (c) a polyether polyol having a hydroxyl number of 80 to 220, a nominal functionality of greater than 2 to 8, and containing from 5 to 45% by weight of copolymerized oxyethylene, based on the total weight of polyether polyol (c), and
    (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
  wherein the in-situ formed polyol blend comprises from 10 to 40% by weight of (a) the monol initiated oxyalkylene ether, from 10 to 30% by weight of (b) the polyether polyol, from 20 to 65% by weight of (c) the polyether polyol, and from 5 to 20% by weight of (d) the polyether polyol, with the sum of the %'s by weight of components (a), (b), (c) and (d) totaling 100% by weight of the in-situ formed polyol blend;
in the presence of:
(C) a blowing agent;
(D) a catalyst; and
(E) a surfactant.

The viscoelastic flexible polyurethane foams comprise the reaction product of:

(A) a diisocyanate and/or polyisocyanate component,
(B) an isocyanate-reactive component comprising:
  (1) an in-situ formed polyol blend having an overall functionality of 2 to 3, an overall hydroxyl number of 50 to 150, which comprises:
    (a) a monol initiated oxyalkylene ether having a hydroxyl number of less than or equal to 56, and containing less than or equal to 20% by weight of copolymerized oxyethylene, based on the total weight of monol initiated oxyalkylene ether (a),
    (b) a polyether polyol having a hydroxyl number of 80 to 220, a nominal functionality of 2, and containing from 5 to 45% by weight of copolymerized oxyethylene, based on the total weight of polyether polyol (b),
    (c) a polyether polyol having a hydroxyl number of 80 to 220, a nominal functionality of greater than 2 to 8, and containing from 5 to 45% by weight of copolymerized oxyethylene, based on the total weight of polyether polyol (c), and
    (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
  wherein the in-situ formed polyol blend comprises from 10 to 40% by weight of (a) the monol initiated oxyalkylene ether, from 10 to 30% by weight of (b) the polyether polyol, from 20 to 65% by weight of (c) the polyether polyol, and from 5 to 20% by weight of (d) the polyether polyol, with the sum of the %'s by weight of components (a), (b), (c) and (d) totaling 100% by weight of the in-situ formed polyol blend;
in the presence of:
(C) a blowing agent;
(D) a catalyst; and
(E) a surfactant.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise, and were determined by GPC as described herein.

All number average and weight average, $M_n$ and $M_w$, respectively, molecular weights herein were determined by gel-permeation chromatography (GPC) using a method based on DIN 55672-1 employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol.

All hydroxyl numbers (i.e. OH numbers) herein were determined according to ASTM D4274-11, and are reported in mg KOH/g polyol.

The molecular weight is the number average equivalent weight multiplied by the starter functionality. The hydroxyl number equals 56,100 divided by the equivalent weight.

As used herein, the term "nominal functionality" refers to the functionality of a polyether polyol which is based solely on the functionality of the starter compound or initiator used in preparing the polyether polyol. The nominal functionality is typically used to describe the functionality of a specific compound.

As used herein, the term "overall functionality" refers to the average number of reactive groups (e.g. hydroxyl, amine, etc.) which are present per molecule of the polyether polyol or polyether polyol blend being described. This term is typically used when either a polyether polyol is prepared from two or more starter compounds or initiators that have different functionalities and/or when a blend of polyether polyols is used in which the individual polyether polyols have different functionalities.

As used herein, the term "in-situ formed" with respect to a polyol blend means producing the polyol blend during the course of an alkoxylation reaction in which at least one epoxide is added to a mixture of an initial starter ($S_i$) and alkoxylation catalyst to initiate the alkoxylation and then at least one continuous starter ($S_c$) feed is added during the course of the alkoxylation to form a blend of polyether polyols that can vary in molecular weight and functionality.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provide an isocyanate index of 100%.

As used herein, the term "viscoelastic flexible foam" or "viscoelastic flexible polyurethane foam" refers to low-resilience polyurethane foam and is commonly referred to as memory foam. These foams typically provide uniform support of any weight placed on the foam targeted to relieve pressure points, and the foam recovers slowly to its original shape once the weight is removed. These foams are mainly used for bedding, pillows, etc.

The in-situ formed polyol blend having an overall functionality of 2 to 3, an overall hydroxyl number of 50 to 150, comprises: (a) a monol initiated oxyalkylene ether having a hydroxyl number of less than or equal to 56, and containing less than or equal to 20% by weight of copolymerized oxyethylene, based on the total weight of monol initiated oxyalkylene ether (a); (b) a polyether polyol having a hydroxyl number of 80 to 220, a nominal functionality of 2, and containing from 5 to 45% by weight of copolymerized oxyethylene, based on the total weight of polyether polyol (b); (c) a polyether polyol having a hydroxyl number of 80 to 220, a nominal functionality of greater than 2 to 8, and containing from 5 to 45% by weight of copolymerized oxyethylene, based on the total weight of polyether polyol (c); and (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d); wherein the in-situ formed polyol blend comprises from 10 to 40% by weight of (a) the monol initiated oxyalkylene ether, from 10 to 30% by weight of (b) the polyether polyol, from 20 to 65% by weight of (c) the polyether polyol, and from 5 to 20% by weight of (d) the polyether polyol, with the sum of the %'s by weight of components (a), (b), (c) and (d) totaling 100% by weight of the in-situ formed polyol blend.

Suitable monol initiated oxyalkylene ethers (a) have a hydroxyl number of less than or equal to 56 and containing less than or equal to 20% by weight of copolymerized oxyethylene. These monols have a hydroxyl number of less than or equal to 56, or of less than or equal to 28.

Suitable initially charged starters ($S_i$) for (a) include polyoxyalkylene monols formed by addition of multiple equivalents of epoxide to a low equivalent weight monofunctional starter. Low equivalent weight monofunctional starters useful herein may be linear or branched compounds, and/or may be naturally-derived or synthetic compounds. Some suitable low equivalent weight monofunctional starters include compounds such as, for example, methanol, ethanol, phenols, allyl alcohol, butyl carbitol, longer chain alcohols, etc., and mixtures thereof. Examples of suitable longer chain alcohols include $C_{10}$, $C_{12}$, $C_{13}$, $C_{14}$ and/or $C_{15}$ monols, which may be used individually or as mixtures. Suitable monoethers include a hydrocarbyl residue (Z) in which the hydrocarbyl residue is a $C_4$-$C_{60}$, and preferably a $C_9$-$C_{30}$ alkyl, aryl or aralkyl group. The hydrocarbyl residue is typically derived from a monohydroxyl compound such as an alcohol or a phenol. Also suitable are monoethers derived from phenols substituted with $C_4$-$C_{15}$ alkyl groups such as, for example, nonylphenol, etc. Suitable epoxides can include, for example, ethylene oxide, propylene oxide, butylene oxide, styrene oxide, etc. and mixtures thereof. The epoxides can be polymerized with the low equivalent weight monofunctional starters using well-known techniques and a variety of catalysts, including alkali metals, alkali metal hydroxides and alkoxides, double metal cyanide complexes, and many more. Suitable initially charged monofunctional starters ($S_i$) can also be made, for example, by first producing a diol or triol and then converting all but one of the remaining hydroxyl groups to an ether, an ester or other non-reactive group. Suitable initially charged monofunctional starters ($S_i$) include those monols described in, for example, U.S. Pat. Nos. 6,391,935 and 6,821,308, the disclosures of which are hereby incorporated by reference. Suitable polyoxyalkylene monols to be used as the initially charged starter ($S_i$) may contain up to 50% by weight, based on 100% by weight of the polyoxyalkylene monol, of copolymerized oxyethylene.

In one embodiment, the initially charged starter ($S_i$) for the monol initiated oxyalkylene ether (a) comprises a polyoxypropylene monol having a hydroxyl number of less than or equal to 80. These compounds facilitate DMC catalyzed addition of epoxide and provide good build ratios for the production of the in-situ formed polyol blends.

The monol initiated oxyalkylene ether (a) may also be characterized in one embodiment as containing up to 20% by weight of copolymerized oxyethylene, based on the total weight of the monol initiated oxyalkylene ether (a). This weight percentage includes the initiator or starter and all of the added epoxide(s). These monol initiated oxyalkylene ethers (a) may contain less than or equal to 20% by weight, or less than or equal to 15% by weight, or less than or equal to 10% by weight, based on 100% by weight of the monol initiated oxyalkylene ether (a), of copolymerized oxyethylene. These monol initiated oxyalkylene ethers (a) may also contain more than 0%, or at least 2% or at least 5%, based on the total weight of the monol initiated oxyalkylene ether (a), of copolymerized oxyethylene. The amount of copolymerized oxyethylene present in the monol initiated oxyalkylene ethers (a) may vary between any combination of these upper and lower values, inclusive, such as, more than 0% to less than or equal to 20%, or at least 2% to less than or equal to 15%, or at least 5% to less than or equal to 10% by weight.

The monol initiated oxyalkylene ethers (a) can have virtually any desired arrangement of oxyalkylene units with the proviso that these contain less than 20% of copolymerized oxyethylene, based on the total weight of the monol initiated oxyalkylene ether (a). This weight percentage includes the initiator or starter and all of the added epoxide (s). Some examples of suitable monol initiated oxyalkylene ethers (a) include PO homopolymers, block EO-PO copolymers, random EO/PO copolymers, PO polymers that are "tipped" with EO or with a mixture of EO and PO are possible. These "tipped" PO polymers should use a mixture of EO and PO to achieve a particular oxyethylene content and/or a desired primary hydroxyl content, or any other desired configuration. The so-called PO homopolymers are suitable with the proviso that they satisfy the above described amounts of copolymerized oxyethylene.

In one embodiment, the monol initiated oxyalkylene ether (a) comprises an oxypropylene block next to the low equivalent weight monofunctional starter followed by a mixed oxypropylene and oxyethylene block at the end of the chain. In another embodiment, the oxyalkylene block at the end of the chain comprises copolymerized oxypropylene and copolymerized oxyethylene wherein the copolymerized oxyethylene content is 20% by weight or less, based on 100% by weight of the oxyalkylene block.

Suitable polyether polyols for component (b) typically have a hydroxyl number of 80 to 220, and a nominal functionality of 2. These polyether polyols may have hydroxyl numbers of at least 80, or at least 100. The polyether polyols may also have hydroxyl numbers of less than or equal to 220, or of less than or equal to 180. Suitable polyether polyols may also have a hydroxyl number ranging between any combination of these upper and lower values, inclusive, of at least 80 to 220, or of at least 100 to 180. These polyether polyols (b) may be prepared from low equivalent weight starters such as, for example, propylene glycol, dipropylene glycol, ethylene glycol, tripropylene glycol, water, methyl-1,3-propanediol, and the like, and mixtures thereof.

Suitable polyether polyols for component (b) contain from 5 to 45% by weight of copolymerized oxyethylene. These polyether polyols may contain at least 5%, or at least 10%, or at least 15%, of copolymerized oxyethylene, based on the total weight of the polyether polyol (b). These polyether polyols may contain 45% or less, or 40% or less, or 35% or less of copolymerized oxyethylene, based on the total weight of the polyether polyol (b). The total weight of the polyether polyol includes the starter or initiator, and all of the added epoxide(s). Suitable polyether polyols herein may contain any amount of copolymerized oxyethylene between the above disclosed upper and lower values, inclusive, unless otherwise stated, such as at least 5% to 45% by weight or less, or at least 10% to 40% by weight or less, or at least 15% to 35% by weight or less.

These polyether polyols (b) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, random EO/PO copolymers that vary the ratio of EO to PO along the chain to provide EO rich end groups or PO rich end groups or any other desired configuration. The epoxides can be polymerized using well-known techniques and a variety of catalysts, including alkali metals, alkali metal hydroxides and alkoxides, double metal cyanide complexes, and many more.

In one embodiment, the polyether polyol (b) has an initial mixed oxypropylene and oxyethylene block that has a low copolymerized oxyethylene content (i.e. 20% by weight oxyethylene content based on 100% by weight of the oxyalkylene block or 20/80 EO/PO) followed by a second mixed oxypropylene and oxyethylene block that has a higher copolymerized oxyethylene content compared to the first block (i.e. 40% by weight oxyethylene content based on 100% by weight of the second oxyalkylene block or 40/60 EO/PO).

Suitable polyether polyols for component (c) typically have a hydroxyl number of 80 to 220, a nominal functionality of greater than 2 to 8. These polyether polyols may also have hydroxyl numbers of at least 80, or at least 100. The polyether polyols may also have hydroxyl numbers of less than or equal to 220, or of less than or equal to 180. Suitable polyether polyols may also have a hydroxyl number ranging between any combination of these upper and lower values, inclusive, of at least 80 to 220, or at least 100 to 180. The polyether polyols may also have a nominal functionality of greater than 2, or of at least 3. The nominal functionality of the polyether polyols may also be less than or equal to 8, or less than or equal to 6. Suitable polyether polyols may have a nominal functionality ranging between any combination of these upper and lower values, inclusive, such as greater than 2 to 8, or at least 3 to 6. These polyether polyols (c) may be prepared from low equivalent weight starters such as, for example, glycerin, trimethylolpropane, pentaerythritol, sucrose, sorbitol, and the like, and mixtures thereof.

Suitable polyether polyols for component (c) contain from 5 to 45% by weight of copolymerized oxyethylene. These polyether polyols may contain at least 5%, or at least 10%, or at least 15%, of copolymerized oxyethylene, based on the total weight of the polyether polyol (c). These polyether polyols may contain 45% or less, or 40% or less, or 35% or less of copolymerized oxyethylene, based on the total weight of the polyether polyol (c). The total weight of the polyether polyol includes the starter or initiator, and all of the added epoxide(s). Suitable polyether polyols herein may contain any amount of copolymerized oxyethylene between the above disclosed upper and lower values, inclusive, unless otherwise stated, such as at least 5% to 45% by weight or less, or at least 10% to 40% by weight or less, or at least 15% to 35% by weight or less.

These polyether polyols (c) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, random EO/PO copolymers that vary the ratio of EO to PO along the chain to provide EO rich end groups or PO rich end groups or any other desired configuration. The epoxides can be polymerized using well-known techniques and a variety of catalysts, including alkali metals, alkali metal hydroxides and alkoxides, double metal cyanide complexes, and many more.

In one embodiment, the polyether polyol (c) has an initial mixed oxypropylene and oxyethylene block that has a low copolymerized oxyethylene content (i.e. 20% by weight oxyethylene content based on 100% by weight of the oxyalkylene block or 20/80 EO/PO) followed by a second mixed oxypropylene and oxyethylene block that has a higher copolymerized oxyethylene content compared to the first block (i.e. 40% by weight oxyethylene content based on 100% by weight of the second oxyalkylene block or 40/60 EO/PO).

Suitable polyether polyols for component (d) typically have a hydroxyl number of 80 to 220, and a nominal functionality of 2 to 8. These polyether polyols may also have hydroxyl numbers of at least 80, or of at least 100. The polyether polyols may also have hydroxyl numbers of less than or equal to 220, or of less than or equal to 180. Suitable polyether polyols may also have a hydroxyl number ranging between any combination of these upper and lower values, inclusive, at least 80 to 220, or at least 100 to 180. The polyether polyols may also have a nominal functionality of at least 2, or of at least 3. The nominal functionality of the polyether polyols may also be less than or equal to 8, or less than or equal to 6. Suitable polyether polyols may have a nominal functionality ranging between any combination of these upper and lower values, inclusive, such as 2 to 8, or 3 to 6. These polyether polyols (d) may be prepared from low equivalent weight starters such as, for example, glycerin, trimethylolpropane, pentaerythritol, sucrose, sorbitol, and the like, and mixtures thereof.

Suitable polyether polyols for component (d) contain 100% by weight of polyoxypropylene, based on the total weight of polyoxyalkylene in polyether polyol (d). Propylene oxide can be polymerized with the starter compound using well-known techniques and a variety of catalysts, including alkali metals, alkali metal hydroxides and alkoxides, double metal cyanide complexes, and many more.

The in-situ formed polyol blend comprises from 10% to 40% by weight, or from 25 to 35% by weight of (a) the monol initiated oxyalkylene ether; from 10 to 30% by weight, or from 15 to 25% by weight of (b) the polyether polyol; from 20 to 65% by weight, or from 30 to 55% by weight of (c) the polyether polyol; and from 5 to 20% by weight, or from 5 to 15% by weight of (d) the polyether polyol, with the sum of the %'s by weight of (a), (b), (c) and (d) totaling 100% by weight of the in-situ formed polyol blend.

The process for preparing the in-situ formed polyol blend having an overall functionality of 2 to 3 and an overall hydroxyl number of 50 to 150 comprises I) introducing into a reaction vessel a mixture comprising:
(1) an initially charged starter ($S_i$) comprising a monofunctional compound having a hydroxyl number of less than or equal to 80, and
(2) a DMC (double metal cyanide) catalyst, II) feeding
(1) an epoxide comprising propylene oxide and ethylene oxide in a weight ratio of 100:0 to 80:20, into the reaction vessel;

III) allowing the epoxide mixture and the initially charged starter ($S_i$) to react and continue polymerizing by feeding the epoxide until the equivalent weight of the monofunctional compound is increased by at least 10% by weight and reaches a value between 1,500 and 6,000;

IV) continuously adding
(1) a low equivalent weight continuously added starter ($S_c$) having a functionality of greater than 2 to 6, and an equivalent weight of 28 to 400 into the reaction vessel while continuing to feed epoxide;

V) completing addition of the low equivalent weight continuously added starter ($S_c$); and VI) allowing the mixture to continue to polymerize in the reaction vessel thereby forming
(1) an intermediate in-situ formed polyol blend having an overall hydroxyl number of 50 to 150, an overall functionality of 2 to 3, and which comprises
(a) a monol initiated oxyalkylene ether having a hydroxyl number of less than or equal to 56, and containing less than 20% by weight of copolymerized oxyethylene, based on 100% by weight of the monol initiated oxyalkylene ether (a),
b) a polyether polyol having a hydroxyl number of 80 to 220, a nominal functionality of 2 and containing from 5 to 45% by weight of copolymerized oxyethylene, based on 100% by weight of the polyether polyol (b), and
(c) a polyether polyol having a hydroxyl number of 80 to 220, a nominal functionality of greater than 2 to 8, and containing from 5 to 45% by weight of copolymerized oxyethylene, based on 100% by weight of the polyether polyol (c);

VII) feeding
(1) an epoxide comprising propylene oxide; while continuously adding (2) a low equivalent weight continuously added starter ($S_c$) having a nominal functionality of greater than 2 to 6, and an equivalent weight of 28 to 400 into the reaction vessel;

VIII) completing addition of the low equivalent weight continuously added starter ($S_c$) and epoxide thereby forming in addition to (a), (b) and (c), (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);

wherein the in-situ formed polyol blend comprises from 10 to 40% by weight of (a) the monol initiated oxyalkylene ether, from 10 to 30% by weight of the polyether polyol (b), from 20 to 65% by weight of the polyether polyol (c), and from 5 to 20% by weight of the polyether polyol (d), with the sum of the %'s by weight of (a), (b), (c) and (d) totaling 100% by weight of the in-situ formed polyol blend.

In general, any epoxide polymerizable using DMC catalysis can be used in the in-situ production of the polyol blend comprising a monol initiated oxyalkylene ether (a) and the three polyether polyols (b), (c) and (d). Suitable epoxides include ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters results in polyether polyols, as is well understood in the art.

Other monomers that will copolymerize with an epoxide in the presence of a DMC catalyst may be included in the process of the invention to make other types of epoxide polymers. Some examples include epoxides copolymerize with oxetanes as described in U.S. Pat. No. 3,404,109, the disclosure of which is herein incorporated by reference, to give polyethers, or with anhydrides to give polyesters or polyetheresters as described in U.S. Pat. Nos. 5,145,883 and 3,538,043, the disclosures of which are herein incorporated by reference, or with carbon dioxide to form polyether carbonate polyols such as those described in U.S. Pat. Nos. 4,826,887, 4,826,952, 4,826,953, 6,713,599, 7,977,501, 8,134,022, 8,324,419, 8,946,466 and 9,249,259, the disclosures of which are herein incorporated by reference, and U.S. Published Patent Application 2015/0232606.

In accordance with this process, an initially charged starter ($S_i$) is used, and the initially charged starter ($S_i$) is different than the continuously added starter ($S_c$). The initially charged starter ($S_i$) is comprised of, either totally or in large part, a compound having one active hydrogen per molecule that can serve as a site for epoxide addition, and having a hydroxyl number of less than or equal to 80, or of less than or equal to 56. The suitable starters for the initially charged starter ($S_i$) are the same monofunctional starters described above as suitable starters for the monol initiated oxyalkylene ether (a). These are formed by addition of multiple equivalents of epoxide to a low equivalent weight monofunctional starter such as, for example, methanol, ethanol, phenols, allyl alcohol, butyl carbitol, longer chain alcohols, etc., and mixtures thereof. Examples of suitable longer chain alcohols include $C_{10}$, $C_{12}$, $C_{13}$, $C_{14}$ and/or $C_{15}$ monols, which may be used individually or as mixtures. Suitable monoethers include a hydrocarbyl residue (Z) in which the hydrocarbyl residue is a $C_4$-$C_{60}$, and preferably a $C_9$-$C_{30}$ alkyl, aryl or aralkyl group. The hydrocarbyl residue is typically derived from a monohydroxyl compound such as an alcohol or a phenol. Also suitable are monoethers derived from phenols substituted with $C_4$-$C_{15}$ alkyl groups such as, for example, nonylphenol, etc. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable initially charged monofunctional starters ($S_i$) can also be made, for example, by first producing a diol or triol and then converting all but one of the remaining hydroxyl groups to an ether, an ester or other non-reactive group.

One suitable class of polyether monol starters or initially charged starters ($S_i$) includes polyoxypropylene monols having a hydroxyl number of less than or equal to 80, or of less than or equal to 56. These compounds facilitate DMC catalyzed addition of epoxide and provide suitable build ratios for the production of the in-situ formed polyether polyol blends herein.

In the process of the present invention, the quantity of an initially charged starter ($S_i$) used depends on many factors, including, for example, the reactor dimensions, the identity of the initially charged starter ($S_i$), the equivalent weights of the initially charged starter ($S_i$) and of the target product, the equivalent weight of the continuously added starter ($S_c$), and other factors.

Any DMC catalyst known in the art is suitable for use in the process of the present invention. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. One suitable type of DMC catalysts is zinc hexacyanocobaltate.

The DMC catalyst includes an organic complexing agent. As disclosed in the preceding references, the complexing agent is needed for an active catalyst. Suitable complexing agents are water-soluble heteroatom-containing organic compounds that can complex with the DMC compound, as well as water-soluble aliphatic alcohols. An example of a suitable aliphatic alcohol is tert-butyl alcohol. The DMC catalyst may include, in addition to the organic complexing agent, a polyether, as is described in U.S. Pat. No. 5,482,908, the disclosure of which is herein incorporated by reference.

Suitable DMC catalysts for use in the process are highly active catalysts such as those described in U.S. Pat. Nos. 5,482,908 and 5,470,813, the disclosures of which are herein incorporated by reference. High activity allows the catalysts to be used at very low concentrations, and possibly at concentrations which are low enough to overcome any need to remove the catalyst from the finished blends of in-situ formed polyol blends.

The process of the invention also requires a continuously added starter ($S_c$) as described in detail herein. Conventional processes for making polyether polyols, including KOH-catalyzed and DMC-catalyzed processes, charges the catalyst and all the starter to be used to the reactor at the start of the polymerization, and then adds the epoxide continuously. In the process of forming an in-situ formed polyol blend suitable for the invention, the DMC catalyst and an initial monofunctional starter (or initially charged starter) ($S_i$) are charged to the reactor followed by epoxide feed and polymerization until the monol reaches the desired equivalent weight. At this point, a first feed (i.e. as described in step IV)(1) above) of continuously added starter ($S_c$) is begun and it proceeds at a continuous controlled rate relative to the continuing epoxide feed until the addition of the first feed of continuously added starter ($S_c$) is completed. Epoxide feed is continued until the desired hydroxyl number of the first feed of continuously added starter ($S_c$) components is reached. The continuously added starter ($S_c$) may be mixed with the epoxide and added to the reactor, or it may be added to the reactor as a separate stream. It is also possible that DMC catalyst can be added continuously with the continuously added starter ($S_c$). In the process of the present invention to form an in-situ formed polyol blend, a second feed (i.e. as described in step VII)(2) above) of continuously added starter ($S_c$) can be started with the epoxide feed after the completion of the first feed of continuously added starter ($S_c$). The second feed of continuously added starter ($S_c$) can be the same starter compound as was used for the first feed of continuously added starter ($S_c$), or it can be a different starter compound. The epoxide and the epoxide composition can be the same during the second feed of continuously added starter ($S_c$) feed as during the first feed of continuously added starter ($S_c$) feed, or the epoxide and the epoxide composition can be different during the second feed of continuously added starter ($S_c$) feed as during the first feed of continuously added starter ($S_c$) feed. The skilled artisan knows and understands that the lowest equivalent weight substance preferably reacts with alkylene oxide in the presence of DMC catalyst, hence the continuously added starter ($S_c$) will preferentially react with the alkylene oxide present. This is commonly known and referred to by one of ordinary skill in the art as "catch up kinetics". This allows the in-situ production of different components of the polyol blend while only minimally affecting the other, higher equivalent weight components. Catch up kinetics is described in "Chemistry and Technology of Polyols for Polyurethanes", $2^{nd}$ Edition, Volume 1, 2016, M. Ionescu, pages 189-190, the disclosure of which is herein incorporated by reference.

The continuously added starter ($S_c$) is typically a low equivalent weight starter or polyol or a blend of low equivalent weight starters or polyols. Low equivalent weight polyols as defined in this application having from 2 hydroxyl groups to 8 hydroxyl groups. It also may be beneficial to add more than one continuously added starter ($S_c$) having different functionalities either simultaneously or sequentially. The functionality of the continuously added starter ($S_c$) or multiple continuously added starters ($S_c$) should be chosen such that the average functionality of the resultant polyol is from 2 to 6, or from 2 to 3. These low equivalent weight polyols may have at least 2 hydroxyl groups. These low equivalent weight polyols may also have 8 hydroxyl groups or less, or 6 hydroxyl groups or less, or 3 hydroxyl groups or less. The low equivalent weight polyols used for the continuously added starter ($S_c$) may contain any number of hydroxyl groups which ranges between any combination of these upper and lower values, inclusive, such as from at least 2 hydroxyl groups to 8 hydroxyl groups or less, or 2 hydroxyl groups to 6 hydroxyl groups, or 2 hydroxyl groups to 3 hydroxyl groups.

Suitable low equivalent weight polyols for the continuously added starter ($S_c$) have a nominal functionality of 2 to 8 and an equivalent weight of 28 to 400.

Examples of suitable low equivalent weight polyols to be used as the continuously added starter ($S_c$) include compounds such as, for example, glycerin, propylene glycol, dipropylene glycol, ethylene glycol, trimethylolpropane, sucrose, sorbitol, tripropylene glycol, and the like, and mixtures thereof. In one embodiment, the first feed of continuously added starter ($S_c$) comprises propylene glycol and glycerin and the second feed of continuously added starter ($S_c$) comprises glycerin. Low equivalent weight polyether polyols prepared by multiple epoxide addition to these polyols or other starters with two or more active hydrogens may also be employed as the continuously added starter ($S_c$).

The continuously added starter ($S_c$) can also be other compounds having at least two active hydrogens per molecule, which are known to be suitable initiators for conventional DMC-catalyzed epoxide polymerizations, including compounds such as, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the disclosures of which are incorporated herein by reference.

As described previously, a wide variety of epoxides can be employed in the current process. Propylene oxide and ethylene oxide are the most commonly used epoxides. A unique feature of the current process is that the compositions of the epoxide can be varied to control the composition of the monol initiated oxyalkylene ether (a) and polyether polyol constituents (b), (c) and (d) in the final product. For example, propylene oxide can be added alone during polymerization of the monol initiated oxyalkylene ether (a), prior to the start of the addition of the continuously added starter ($S_c$). After the first feed of continuously added starter ($S_c$) is started, a blend of ethylene oxide and propylene oxide can be fed to yield a high functionality polyether polyol comprised of a poly(oxyethylene-oxypropylene) copolymer. Because oxide addition via DMC catalysis occurs predominantly on the lower equivalent weight polyether polyol, the monol initiated oxyalkylene ether component can remain largely poly(oxypropylene). By reversing these sequences, the monol initiated oxyalkylene ether could be produced with higher poly(oxyethylene) content and the polyether polyol (from the first feed of continuously added starter ($S_c$)) could be predominantly poly(oxypropylene).

The epoxide composition may also be varied during the initial polymerization of the monol initiated oxyalkylene ether and/or at some point during and/or after the addition of the continuously added starter ($S_c$). This provides flexibility for controlling the distribution of oxyethylene or oxypropylene within the monol initiated oxyalkylene ether and polyether polyols and allows some control of the primary versus secondary hydroxyl content of the monol initiated oxyalkylene ether and polyether polyols, and thus, the relative reactivity of the constituents in the final composition. In this way, it is possible to design the product to meet the reactivity and performance requirements of the intended applications such as viscoelastic polyurethane foams.

An example of the process to prepare an in-situ formed multifunctional polyol blend is by first alkoxylating a monol, diol, and triol with a DMC catalyst following the procedure described in U.S. Pat. No. 6,491,846, the disclosure of which is herein incorporated by reference, and then alkoxylating a triol. By way of example, the monol starter or initially charged starter ($S_i$) may comprise a 1600 MW (35 OH #) monol inhibited with BHT made from the propoxylation of Neodol 25 (available from Shell) with a DMC catalyst. In a typical reaction to make the in-situ formed polyol blend, the monol starter (or initially charged starter) ($S_i$) is charged at room temperature followed by addition of the DMC catalyst as dry powder. Alternatively, the monol starter or initially charged starter ($S_i$) may be heated before addition to the reactor or it may be charged to a heated reactor. The DMC catalyst may also be added as a slurry in the monol starter or initially charged starter ($S_i$). After charging the monol starter or initially charged starter ($S_i$) and DMC catalyst, vacuum is pulled on the reactor contents. The reactor contents are heated to the reaction temperature. This may be followed by nitrogen stripping under vacuum. Vacuum and nitrogen stripping can occur before, during or after the reactor contents have reached the reaction temperature. After nitrogen stripping is stopped, the vacuum can be continued without nitrogen stripping. Before starting the oxide feed to the reactor, the reactor is blocked in under vacuum and can remain under vacuum for a given time to check for any leaks to the reactor. The DMC catalyst is then activated by adding a portion of propylene oxide or a mixture of propylene and ethylene oxide and allowing it to react. Prior to oxide addition, the reactor can be under vacuum or can be pressured up using nitrogen or other inert gas. After the DMC catalyst activation is complete as evidenced by a decrease in reactor pressure or by a specific temperature change, the oxide feed is restarted. The DMC catalyst can also be activated by starting the oxide feeds at a reduced rate and continuously adding the oxide feeds until the reactor temperature increases and the reactor pressure decreases and the reactor cooling system indicates that the reactor has switched from heating to cooling indicating that the catalyst is active and the reaction is proceeding. After detecting the activation either through the batch addition of oxide or the continuous feeding of oxide, the propylene and/or ethylene oxide feed rates are ramped up to the set point typically in 5 to 30 minutes. The typical reaction temperature for the DMC catalyzed reaction is 130 to 150° C. with a mixture of propylene oxide and/or ethylene oxide. After the monol starter or initially charged starter ($S_i$) has increased in molecular weight by at least 10% through the addition of propylene and/or ethylene oxide, a mixture of glycerin that has been acidified with phosphoric acid and propylene glycol is continuously added along with a mixture of propylene oxide and ethylene oxide until a targeted hydroxyl number is reached. The continuously added starter ($S_c$), i.e. propylene glycol and/or glycerin feeds, may be started at the target feed rates or ramped to the target feed rates. The continuously added starter ($S_c$), i.e. propylene glycol and/or glycerin feeds, may be started simultaneously or at different times. Additionally the continuously added starter ($S_c$), i.e. propylene glycol and/or glycerin feeds, may be fed at a constant maximum feed rate or the feed rate of one or both may be varied during this step. After the target hydroxyl number is reached, the continuously added starter ($S_c$), i.e. propylene glycol and/or glycerin feeds, are stopped either at their target feed rates or by ramping down the feed rates. Propylene oxide and ethylene oxide are continuously added after the continuously added starter ($S_c$) are stopped until a target hydroxyl number is reached. The feeding of alkylene oxide after the continuously added starter ($S_c$) stops is referred to as a non-CAOS cap. Alternatively, the non-CAOS cap may be eliminated and the continuously added starter ($S_c$), e.g. propylene glycol and/or glycerin feeds, continued until the target hydroxyl number is reached. After the continuously added starter ($S_c$) is stopped and the propylene oxide and ethylene oxide are fed to react away the continuously added starter ($S_c$), the propylene oxide and ethylene oxide are continuously added at a different weight ratio that is higher in ethylene oxide until a target hydroxyl number is reached. This change in the propylene oxide and ethylene oxide weight ratio from a ratio low in ethylene oxide to one that is higher in ethylene oxide may be accomplished by stopping the oxide feeds and restarting at the desired ratio or by simultaneously ramping down the propylene oxide feed and ramping up the ethylene oxide feed to the new peak feed rates and ratios. After the hydroxyl number is reached, the ethylene oxide feed is stopped and the continuously added starter ($S_c$), e.g. glycerin feed, is resumed (i.e. a second feed of continuously added starter ($S_c$)). The continuously added glycerin feed ($S_c$) may be started directly at the target feed rate or ramped up to the target rate. The continuously added starter ($S_c$), e.g. glycerin, and propylene oxide addition are continued until a target hydroxyl number is reached. After this, the continuously added starter ($S_c$), e.g. glycerin, feed is stopped directly or ramped down and propylene oxide addition continues until a target hydroxyl number is reached. This corresponds to a non-CAOS cap in the all propylene oxide triol. The propylene oxide rate may be stopped directly or ramped down to zero. This in-situ formed multifunctional polyol blend can have an overall functionality of 2 to 3 and an overall hydroxyl number of 50 to 150 mg KOH/g. At the conclusion of the oxide feeds, all feed lines are blown out with nitrogen into the reactor and the reactor contents are held at the reaction temperature (cooked-out) until the reactor pressure levels off. After this the product is stripped under vacuum simultaneously or continuously with nitrogen sparging and/or steam in one or more steps. The polyol is then cooled typically to 80 to 100° C. and one or more antioxidants are added followed by mixing. The product is then cooled to 40 to 80° C. and discharged from the reactor. Antioxidant addition can occur at different temperatures and the final polyether polyol can be discharged from the reactor at different temperatures.

The process for the production of a viscoelastic polyurethane foam comprises reacting (A) a diisocyanate and/or a polyisocyanate component, with (B) an isocyanate-reactive component comprising (1) the in-situ formed polyol blend having an overall functionality of 2 to 3 and an overall hydroxyl number of 50 to 150 which is described herein, in the presence of (C) a blowing agent, (D) a catalyst, and (E) a surfactant.

Suitable diisocyanates and polyisocyanates to be used as component (A) in the viscoelastic foams herein and the process of making these foams include, for example, isocyanate-functional compounds which contain two or more free NCO groups per molecule and are known to be useful for preparing flexible polyurethane foam. Suitable isocyanate-functional compounds include aromatic, aliphatic, and cycloaliphatic di- and/or polyisocyanates. Some examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Suitable polyisocyanates include toluene diisocyanate (TDI, which is usually a mixture of 2,4- and 2,6-isomers), diphenylmethane diisocyanate (MDI which is usually a mixture of the 2,2'-, the 2,4'- and the 4,4'-isomers), and various mixtures thereof. In one embodiment, the isocyanate-functional compound comprises toluene diisocyanate, preferably a mixture of 2,4- and 2,6-isomers.

The isocyanate-reactive component (B) comprises the in-situ formed polyol blend (1) described herein which has an overall hydroxyl number of 50 to 150 and an overall functionality of 2 to 3. This polyol blend may have a hydroxyl number of at least 50, or at least 70, or at least 85. This polyol blend may also have a hydroxyl number of 150 or less, or 130 or less, or of 115. The in-situ formed polyol blend may have a hydroxyl number ranging between any combination of these upper and lower values, inclusive, such as at least 50 to 150 or less, or at least 70 to 130 or less, or at least 85 to 115 or less.

In the isocyanate-reactive component (B), the in-situ formed polyol blend (1) also typically has an overall functionality of 2 to 3. This in-situ formed polyol blend may have an overall functionality of 2, or at least 2.2. The overall functionality of this in-situ formed polyol blend may also be 3 or less, or 2.8 or less. The in-situ formed polyol blend (1) may have an overall functionality ranging between any combination of these upper and lower values, inclusive, such as 2 to 3, or 2.2 to 2.8.

The composition of the in-situ formed polyol blend (1) is as described hereinabove.

In addition to the in-situ formed polyol blend (1), the isocyanate-reactive component (B) for the viscoelastic flexible polyurethane foams and process of preparing the viscoelastic flexible foams may additionally comprise a conventional polyether polyol, a polyester polyol, a polyether carbonate polyol, a polyetherester polyol, polymer polyols, amine-terminated polyethers, polythioethers, polyacetals, polycarbonates, etc., as well as various low equivalent weight chain extenders and/or crosslinking agents, both of which may contain hydroxyl groups and/or amine groups capable of reacting with the isocyanate groups of the isocyanate component.

The in-situ formed polyol blend (1) essentially corresponds to the in-situ formed polyol blend described herein above, and is characterized by the same overall hydroxyl numbers and average functionalities.

As previously described, the in-situ formed polyol blends (1) comprise (a) a monol initiated oxyalkylene ether having a hydroxyl number of less than or equal to 56 and containing less than or equal to 20% by weight of copolymerized oxyethylene, (b) a polyether polyol having a hydroxyl number of 80 to 220, a nominal functionality of 2, and containing from 5 to 45% by weight of copolymerized oxyethylene, (c) a polyether polyol having a hydroxyl number of 80 to 220, a nominal functionality of greater than 2 to 6, and containing from 5 to 45% by weight of copolymerized oxyethylene, and (d) a polyether polyol having a hydroxyl number of 80 to 220, a nominal functionality of 2 to 8, and containing 100% of copolymerized oxypropylene.

In addition, in the process of preparing the viscoelastic flexible polyurethane foam, the isocyanate-reactive component (B) which comprises (1) the in-situ formed polyol blend described above may additionally comprise at least one of: (2)(a) a polyether polyol having an OH number of 20 to 240, an average functionality of 2 to 8, and containing at least 50% by weight of copolymerized oxyethylene, based on 100% by weight of component (2)(a); and/or (2)(b) a filled polyol.

In one embodiment, these isocyanate-reactive components additionally comprise (2)(a) one or more polyether polyols having an OH number of 20 to 240, an average functionality of 2 to 8, and containing at least 50% by weight of copolymerized oxyethylene, based on the total weight of component (2)(a).

Suitable compounds to be used as polyether polyols (2)(a) include those polyols which have a functionality of at least 2 to 8 or less, a hydroxyl number of at least 20 to 240 or less, and contain at least 50% of copolymerized oxyethylene, based on 100% by weight of the polyether polyol (2)(a). Suitable polyether polyols for component (2)(a) may commonly be referred to as cell opening polyols.

These polyether polyols for component (2)(a) may have hydroxyl numbers of at least 20 mg KOH/g, or at least 30 mg KOH/g, or at least 35 mg KOH/g. In addition, the polyether polyols generally have hydroxyl numbers of 240 mg KOH/g or less, or 170 mg KOH/g or less, or 50 mg KOH/g or less. The suitable polyether polyols of the present invention may be characterized by a hydroxyl number between any of the above values, inclusive, unless otherwise stated, such as, at least 20 to 240 mg KOH/g or less, or at least 30 to 170 mg KOH/g or less, or at least 35 mg KOH/g to 50 mg KOH/g or less.

The average functionality of these polyether polyols (2)(a) ranges from at least 2, or at least 2.5. The average functionality is also typically 8 or less, or 6 or less. The average functionality of the polyether polyols (2)(a) may range between any combination of these upper and lower values, inclusive, such as at least 2 to 8 or less, or at least 2.5 to 6 or less.

Suitable polyether polyols used as component (2)(a) also contain at least 50% to 99% by weight or less of copolymerized oxyethylene, based on 100% by weight of the polyether polyol. This weight percent includes the starter or initiator, and the all of the added epoxide(s). These polyether polyols may contain at least 50%, or at least 60% or at least 70% by weight, of copolymerized oxyethylene, based on 100% by weight of the polyether polyol. These polyether polyols may also contain 99% or less, or 90% or less, or 85% or less of copolymerized oxyethylene, based on 100% by weight of the polyether polyol. Suitable polyether polyols herein may contain any amount of copolymerized oxyethylene between the above disclosed values, inclusive, such as at least 50% to 99% or less, or at least 60% to 90% or less, or at least 70% to 85% by weight or less, of copolymerized oxyethylene.

Some examples of suitable polyether polyols for component (2)(a) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (2)(a) include low molecular weight starters such as, for example, glycerin, propylene glycol, dipropylene glycol, ethylene glycol, trimethylolpropane, sucrose, sorbitol, tripropylene glycol, and the like, and mixtures thereof.

Suitable epoxides for component (2)(a) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

These polyether polyols can have any desired arrangement of oxyalkylene units with the proviso that they contain at least 50% of copolymerized oxyethylene, based on the 100% by weight of the polyether polyol. Thus, the polyether polyols (2)(a) can be EO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene and/or a particular primary hydroxyl content, random EO/PO copolymers that vary the ratio of EO to PO along the chain to provide EO rich end groups or PO rich end groups or any other desired configuration.

In one embodiment, the isocyanate-reactive component may additionally comprise (2)(b) a filled polyol which is also known as a polymer polyol. Examples of suitable filled polyols for the invention include, for example, (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyols (also known as PHD polyols), and (iv) mixtures thereof.

Suitable (i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). Conventionally, the solids content of SAN polymer polyols is from 5% up to 60% by weight of solids, based on the total weight of the SAN polymer polyol composition. The solids content may be at least 5%, or at least 10% by weight of solids, based on the total weight of the SAN polymer polyol composition. The solids content may also be 60% by weight or less, or 50% by weight or less, based on the total weight of the SAN polymer polyol composition. The amount of solids content may range between any combination of these upper and lower values, inclusive, such as from 5% to 60%, or from 10% to 50% by weight of solids, based on the total weight of the SAN polymer polyol composition.

Examples of suitable SAN polymer polyols to be used as component (2)(b) herein include those SAN polymer polyols disclosed in, for example, but are not limited to, U.S. Pat. Nos. 5,321,077, 5,324,774, 5,364,906, 5,358,984, 5,453,469, 5,488,085, 5,496,894, 5,554,662, 5,594,066, 5,814,699, 5,824,712, 5,916,994, 5,995,534, 5,990,185, 6,117,937, 6,455,603, 6,472,447, 6,624,209, 6,713,599, 6,756,414, 7,179,882, 7,759,423, etc., the disclosures of which are hereby incorporated by reference.

The SAN polymer polyols suitable for the present invention are prepared by the in-situ polymerization of acrylonitrile and styrene, in a base polyol. Suitable base polyols may be conventional polyether polyols, polyester polyols, poly (oxyalkylene) polyols, etc. Methods for preparing SAN polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

One suitable SAN polymer polyol to be used as component (2)(b) in the present invention comprises the free radical polymerization product of styrene and acrylonitrile in a base polyol, wherein the base polyol has a nominal functionality of about 3, a molecular weight of about 4750, and an OH number of about 35. The solids content of this SAN polymer polyol is about 43% solids, in which the styrene to acrylonitrile content is about 64% to 36%.

Another suitable SAN polymer polyol for component (2)(b) in the present invention comprises the free radical polymerization product of styrene and acrylonitrile in a base polyol, wherein the base polyol has a nominal functionality of about 3, a molecular weight of about 3000, and an OH number of about 56. The solids content of this SAN polymer polyol is about 49% solids, in which the styrene to acrylonitrile content is about 67% to 33%.

Suitable polyisocyanate polyaddition (PIPA) polyols for component (2)(b) contain polyurethane particles dispersed in a polyol carrier (i.e. base polyol). The polyurethane particles in PIPA polyols are formed in-situ by the reaction of an isocyanate with an alkanolamine (e.g., triethanolamine). The solids content of the PIPA polyols may typically range from 5% up to 60% by weight, based on the total weight of the PIPA composition. The solids content may be at least 5%, or at least 10% by weight of solids, based on the total weight of the PIPA composition. The solids content may also be 60% by weight of less, or 50% by weight or less, based on the total weight of the PIPA composition. The amount of solids content may range between any combination of these upper and lower values, inclusive, such as from 5% to 60%, or from 10% to 50% by weight of solids, based on the total weight of the PIPA composition.

Examples of suitable PIPA polyols can be found in, for example, U.S. Pat. Nos. 4,374,209 and 5,292,778, the disclosures of which are herein incorporated by reference.

Suitable polyhydrazodicabonamide polyols (which are also commonly referred to as PHD polyols or PHD dispersion polyols) to be used as component (2)(b) of the present invention include, for example, those compounds which are typically prepared by the in-situ polymerization of an isocyanate mixture with an amine group containing compound such as, a diamine and/or a hydrazine, in a base polyol. Suitable base polyols typically comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of 3 to 30 weight %, based on the total weight of the PHD polyol. The solids content of the PHD polyols may be at least 3%, or at least 5% by weight, based on the total weight of the PHD polyol. The solids content of the PHD polyols may also be 30% or less, or 25% by weight or less, based on the total weight of the PHD polyol. The PHD polyols may have a solids content that ranges between any combination of these upper and lower values, inclusive, such as from 3% to 30% by weight, or from 5 to 25% by wt., based on the total weight of the PHD polyol.

As previously stated, PHD polyols are typically prepared by the in-situ polymerization of an isocyanate mixture in a polyol. More specifically, the isocyanate mixture typically comprises 80 parts by weight, based on the total weight of the isocyanate mixture, of 2,4-toluene diisocyanate, and 20 parts by weight, based on the total weight of the isocyanate mixture, of 2,6-toluene diisocyanate.

Suitable amine group containing compounds to be polymerized with the isocyanate compound include in preparing the PHD polyols, for example, compounds such as polyamines, hydrazines, hydrazides, ammonia or mixtures of ammonia and/or urea and formaldehyde.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethyl-ethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a relative molecular mass of 48 to 10,000 Daltons. They may also have relative molecular masses of 60 to 1000 Daltons, or of 62 to 200 Daltons.

The hydrazines used may be hydrazine itself or monosubstituted or N,N'-disubstituted hydrazines. The substituents may be $C_1$ to $C_6$ alkyl groups, cyclohexyl groups or phenyl groups. The hydrazines generally have a relative molecular mass of 32 to 200 Daltons. Hydrazine itself is suitable for the invention herein.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethylene glycol, triethylene glycol, tetraethylene glycol, dipropylene glycol, tripropylene glycol and hydroquinone; and the amides of hydrazinomonocarboxylic acid (semicarbazides), e.g. with the above mentioned diamines and polyamines. The hydrazides generally have a relative molecular mass of 70 to 10,000 Daltons, or of 75 to 1000 Daltons, or of 90 to 500 Daltons. Any combination of these upper and lower limits for molecular weights can be used for the hydrazides herein.

In special cases, a proportion of isocyanates or amines, hydrazines and hydrazides which have an average functionality higher than 2 may also be used, especially in combination with the corresponding monofunctional compounds.

In accordance with the present invention, preferred base polyols for preparing the PHD polyols comprise polyether polyols and poly(oxyalkylene) polyols.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089,835, 4,260,530 and 4,324,715, the disclosures of which are hereby incorporated by reference.

In one embodiment, a foam modifier or foam processing aid is added to the formulation to enhance processing and help stabilize the viscoelastic flexible foam against cold flow and/or dishing by providing dimensional stability against deformation and reduced settling of the viscoelastic flexible foam. These processing aids or modifiers are typically chain extenders and/or cross-linking agents.

In addition, the foam modifiers or processing aids may have an OH number of at least 300, or of at least 600.

Suitable blowing agents (C) for the present invention include, for example chemical blowing agents, i.e. isocyanate reactive agents that generate blowing gases, such as for example water and formic acid and physical blowing agents such as acetone, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of 5 to 30% by weight. Such products are sufficiently well known from plastics chemistry, and are described in U.S. Pat. No. 4,972,002, the disclosure of which is herein incorporated by reference.

The amount of blowing agent or blowing agent mixture used may range from 0.5 to 20% by weight, based on 100% by weight of (B) the isocyanate-reactive component. As used herein with respect to the amount of blowing agent, the isocyanate-reactive component includes (1) the in-situ formed polyol blend having an overall functionality of 2 to 3 and an overall hydroxyl number of 50 to 150 as described herein. In some instances, the amount of blowing agent present may be at least 0.5% or at least 0.75% by weight, based on 100% by weight of component (B). The amount of blowing agent present may also be 20% or less, or 10% by weight or less, based on 100% by weight of component (B). The blowing agent may be present in any amount ranging between any combination of these upper and lower above values, inclusive, such as at least 0.5% to 20% or less, or at least 0.75% to 10% by weight or less, based on 100% by weight of component (B).

When water is the blowing agent, the amount of water typically present can range from at least 0.5 to 10%, based on 100% by weight of component (B) the isocyanate-reactive component. In some instances, the amount of blowing agent present may be at least 0.5% or at least 0.75% by weight, based on 100% by weight of component (B). The amount of water present as a blowing agent may also be 10% or less, or 7% by weight or less, based on 100% by weight of component (B). The blowing agent may be present in any amount ranging between any combination of these upper and lower values, inclusive, such as at least 0.5% to 10% or less, or at least 0.75% to 7% by weight or less, based on 100% by weight of component (B). The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Henecke Novaflex, CarDio (Cannon Viking Limited) and Beamech ($CO_2$) machines, which are known by those skilled in the art.

The viscoelastic flexible foam is produced in the presence of a surfactant, which helps to stabilize the viscoelastic flexible foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of at least 0.1 to 4 parts, based on 100% by weight of component (B). The surfactant may be present in amounts ranging from at least 0.1, or at least 0.2 parts, based on 100% by weight of component (B).

The surfactant may be also present in amounts ranging from 4 parts or less, or 3 parts or less, based on 100% by weight of component (B). The amount of surfactant may range between any combination of these upper and lower values, inclusive, such as at least 0.1 to 4 parts, or at least 0.2 to 3 parts, based on 100% by weight of component (B).

At least one polyurethane catalyst is required to catalyze the reactions of the isocyanate-reactive components and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like.

The polyurethane catalysts are typically used in an amount within the range of 0.01 to 3 parts, based on 100% by weight of component (B). The polyurethane catalysts may be present in amounts of at least 0.01, or at least 0.1 parts, based on 100% by weight of component (B). The polyurethane catalysts may be present in amounts of 3 parts or less, or 2 parts or less based on 100% by weight of component (B). The polyurethane catalysts may be present in any amount ranging between any combination of these upper and lower values, inclusive, such as at least 0.01 to 3 parts, or at least 0.1 to 2 parts, based on 100% by weight of component (B).

Flame retardants, antioxidants, pigments, dyes, liquid and solid fillers, and many other commercial additives can also be included in the viscoelastic flexible foams in conventional amounts.

The viscoelastic foams of the invention comprise the reaction product of (A) a diisocyanate and/or a polyisocyanate component, with (B) an isocyanate-reactive component comprising (1) the in-situ formed polyol blend having an overall functionality of 2 to 3 and an overall hydroxyl number of 50 to 150 which is described herein, in the presence of (C) a blowing agent, (D) a catalyst, and (E) a surfactant. Suitable components for these foams are as described hereinabove.

The viscoelastic flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor.

Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The viscoelastic flexible foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded viscoelastic flexible foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The viscoelastic flexible foam expands to fill the mold and produce a part with the shape and dimensions of the mold.

Although less preferred, an isocyanate-terminated prepolymer approach to making the viscoelastic flexible foams can also be used. In this approach, a significant portion of the isocyanate-reactive mixture is reacted with the polyisocyanate, and the resulting isocyanate-terminated prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the dislcosure of which is herein incorporated by reference, using a Amscor Model 1377 automated foam porosity tester. A 2 inch×2 inch×1 inch piece of foam was cut from near the center of the test specimens which itself was cut from the foam blocks after production. Air flow, expressed as standard cubic feet per minute (i.e. scfpm), was measured through the 1 inch thickness at a pressure differential of 0.5 inches of water less than atmospheric pressure. The air flow was in the direction of rise of the foam.

The test used to define foam recovery rate from deformation is the 95% height recovery time as described in ASTM D3574-17. A recovery rate of less than 3 seconds, indicates a fast recovering foam such as observed for resilient foam types. A recovery rate of greater than or equal to 3 seconds is indicative of a slow recovery foam often referred to as "viscoelastic" or "memory" foam.

Other viscoelastic flexible foam physical properties reported in the examples were measured per the standard procedures described in ASTM D3574-17 having the title "Standard Test Methods for Flexible Cellular Materials-Slab, Bonded, and Molded Urethane Foams".

Commercial production of viscoelastic flexible foams involves mixing together a suitable polyisocyanate, and an isocyanate-reactive component which comprises the in-situ formed polyol blend described above, in the presence of a blowing agent, a surfactant, a catalyst, and optionally, various other compounds which are known in the field of polyurethane chemistry to be suitable for preparing viscoelastic flexible foams.

Various aspects of the subject matter described herein are set out in the following numbered clauses:

Clause 1. A novel in-situ formed polyol blend having an overall functionality of 2 to 3 and an overall hydroxyl number of 50 to 150, which comprises (a) a monol initiated oxyalkylene ether having a hydroxyl number of less than or equal to 56 mg KOH/g polyol, and containing less than or equal to 20% of copolymerized oxyethylene, based on the total weight of the monol initiated oxyalkylene ether (a); (b) a polyether polyol having a hydroxyl number of 80 mg KOH/g polyol to 220 mg KOH/g polyol, a nominal functionality of 2, and containing from 5 to 45% of copolymerized oxyethylene, based on the total weight of the polyether polyol (b); (c) a polyether polyol having a hydroxyl number of 80 mg KOH/g polyol to 220 mg KOH/g polyol, a nominal functionality of greater than 2 to 8, and containing from 5 to 45% of copolymerized oxyethylene, based on the total weight of the polyether polyol (c), and (d) a polyether polyol having a hydroxyl number of 80 to 220 mg KOH/g polyol, a nominal functionality of 2 to 8, and containing 100% by weight of polyoxypropylene, based on the total weight of polyoxyalkylene in polyether polyol (d); wherein the in-situ formed polyol blend comprises 10 to 40% by weight of the monol initiated oxyalkylene ether (a), from 10 to 30% by weight of the polyether polyol (b), from 20 to 65% by weight of the polyether polyol (c), and from 5 to 20% by weight of the polyether polyol (d), with the sum of the %'s by weight of (a), (b), (c) and (d) totaling 100% by weight of the in-situ formed polyol blend.

Clause 2. The in-situ formed polyol blend of clause 1, wherein the monol initiated oxyalkylene ether (a) comprises an oxypropylene block next to the low equivalent weight monofunctional starter followed by a mixed oxyalkylene block at the end of the chain which comprises copolymerized oxypropylene and copolymerized oxyethylene.

Clause 3. The in-situ formed polyol blend of clause 2, wherein the mixed oxyalkylene block at the end of the chain which comprises copolymerized oxypropylene and copolymerized oxyethylene contains 20% by weight or less of copolymerized oxyethylene, based on 100% by weight of the mixed oxyalkylene block.

Clause 4. The in-situ formed polyol blend of one of clause 1 to clause 3, wherein the polyether polyol (b) has an initial mixed oxypropylene and oxyethylene block that has a low copolymerized oxyethylene content (i.e. 20% by weight oxyethylene content based on 100% by weight of the oxyalkylene block or 20/80 EO/PO) followed by a second mixed oxypropylene and oxyethylene block that has a higher copolymerized oxyethylene content compared to the first block (i.e. 40% by weight oxyethylene content based on 100% by weight of the second oxyalkylene block or 40/60 EO/PO).

Clause 5. The in-situ formed polyol blend of one of clause 1 to clause 4, wherein the polyether polyol (c) has an initial mixed oxypropylene and oxyethylene block that has a low copolymerized oxyethylene content (i.e. 20% by weight oxyethylene content based on 100% by weight of the oxyalkylene block or 20/80 EO/PO) followed by a second mixed oxypropylene and oxyethylene block that has a higher copolymerized oxyethylene content compared to the first block (i.e. 40% by weight oxyethylene content based on 100% by weight of the second oxyalkylene block or 40/60 EO/PO).

Clause 6. The in-situ formed polyol blend of one of clause 1 to clause 5, wherein (d) the polyether polyol has a functionality of 3 to 6, and a hydroxyl number of 100 to 180.

Clause 7. The in-situ formed polyol blend of one of clause 1 to clause 6, wherein (d) the polyether polyol comprises the reaction product of a low equivalent weight starter comprising glycerin, trimethylolpropane, pentaerythritol, sucrose, sorbitol, or a mixture thereof, with propylene oxide.

Clause 8. The in-situ formed polyol blend of one of clause 1 to clause 7, wherein (a) the monol initiated oxyalkylene ether has a hydroxyl number of less than or equal to 28.

Clause 9. The in-situ formed polyol blend of one of clause 1 to clause 8, wherein (a) the monol initiated oxyalkylene ether contains from 2% to 15% by weight of copolymerized oxyethylene, or 5 to 10% by weight of copolymerized oxyethylene.

Clause 10. The in-situ formed polyol blend of one of clause 1 to clause 9, wherein (b) the polyether polyol has a hydroxyl number of 100 to 180.

Clause 11. The in-situ formed polyol blend of one of clause 1 to clause 10, wherein (b) the polyether polyol contains 10 to 40% by weight, or 15 to 35% by weight of copolymerized oxyethylene.

Clause 12. The in-situ formed polyol blend of one of clause 1 to clause 11, wherein (c) the polyether polyol has a functionality of greater than 2 to 6, and a hydroxyl number of 100 to 180.

Clause 13. The in-situ formed polyol blend of one of clause 1 to clause 12, wherein (c) the polyether polyol has a functionality of 3 to 6.

Clause 14. The in-situ formed polyol blend of one of clause 1 to clause 13, wherein (c) the polyether polyol contains 10 to 40% by weight, or 15 to 35% by weight of copolymerized oxyethylene.

Clause 15. The in-situ formed polyol blend of one of clause 1 to clause 14, which comprises from 25 to 35% by weight of the monol initiated oxyalkylene ether (a); from 15 to 25% of the polyether polyol (b); from 30 to 55% by weight of the polyether polyol (c); and from 5 to 15% by weight of the polyether polyol (d), with the sum of the %'s by weight of (a), (b), (c) and (d) totaling 100% by weight of the in-situ formed polyol blend.

Clause 16. A process of preparing the in-situ formed polyol blend of one of clause 1 to clause 15, which comprises: I) introducing into a reaction vessel a mixture comprising: (1) an initially charged starter ($S_i$) which comprises a monofunctional compound having a hydroxyl number of less than or equal to 80, and (2) a DMC (double metal cyanide) catalyst; II) feeding (1) an epoxide comprising propylene oxide and ethylene oxide in a weight ratio of 100:0 to 80:20, into the reaction vessel; III) allowing the epoxide mixture and the initially charged starter ($S_i$) to react and to polymerize by feeding the epoxide until the equivalent weight of the monofunctional compound is increased by at least 10% by weight and reaches a value between 1,500 and 6,000; IV) continuously adding (1) a low equivalent weight continuously added starter ($S_c$) having a nominal functionality of greater than 2 to 6, and an equivalent weight of 28 to 400 into the reaction vessel while continuing to feed epoxide; V) completing addition of the continuously added starter ($S_c$); VI) allowing the mixture to continue to polymerize in the reaction vessel thereby forming (1) an intermediate in-situ formed polyol blend which has an overall hydroxyl number of 50 to 150, an overall functionality of 2 to 3, and which comprises (a) a monol initiated oxyalkylene ether having a hydroxyl number of less than or equal to 56, and containing less than or equal to 20% by weight of copolymerized oxyethylene, based on 100% by weight of (a); (b) a polyether polyol having a hydroxyl number of 80 to 220, a nominal functionality of 2 and containing from 5 to 45% by weight of copolymerized oxyethylene, based on the total weight of the polyether polyol (b); and (c) a polyether polyol having a hydroxyl number of 80 to 220, a nominal functionality of greater than 2 to 8, and containing from 5 to 45% by weight of copolymerized oxyethylene, based on the total weight of the polyether polyol (c); VII) feeding (1) an epoxide comprising propylene oxide while continuously adding (2) a low equivalent weight continuously added starter ($S_c$) having a nominal functionality of 2 to 8, and an equivalent weight of 28 to 400 into the reaction vessel; VIII) completing addition of the continuously added starter ($S_c$) and epoxide thereby forming in addition to (a), (b) and (c); (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d); wherein (1) the in-situ formed polyol blend comprises from 10 to 40% by weight of the monol initiated oxyalkylene ether (a), from 10 to 30% by weight of the polyether polyol (b), from 20 to 65% by weight of the polyether polyol (c), and from 5 to 20% by weight of the polyether polyol (d), with the sum of the %'s by weight of (a), (b), (c) and (d) totaling 100% by weight of the in-situ formed polyol blend.

Clause 17. The process of clause 16, wherein the initially charged starter ($S_i$) has a hydroxyl number of less than 56.

Clause 18. The process of one of clause 16 to clause 17, wherein the initially charged starter ($S_i$) comprises a monol initiated oxyalkylene ether which comprises the reaction product of a monofunctional starter and an epoxide.

Clause 19. The process of one of clause 16 to clause 18, wherein the continuously added starter ($S_c$) comprises a low equivalent weight polyether polyol prepared by alkaline catalysis or by DMC catalysis.

Clause 20. An isocyanate-reactive component comprising (1) the in-situ formed polyol blend of one of clause 1 to clause 15, and (2) at least one of (2)(a) a polyether polyol having a hydroxyl number of 20 to 240, an average functionality of 2 to 8, and containing at least 50% of copolymerized oxyethylene, based on 100% by weight of (2)(a), or (2)(b) a filled polyol.

Clause 21. The isocyanate-reactive component of clause 20, additionally comprising (3) at least one of (3)(a) a chain extender, (3)(b) a crosslinking agent, or (3)(c) a foam modifier or a foam processing aid.

Clause 22. The isocyanate-reactive component of clause 21, wherein (3)(c) the foam modifier or foam processing aid has a hydroxyl number of at least 300, or of at least 600.

Clause 23. An isocyanate-reactive component comprising (1) the in-situ formed polyol blend of one of clause 1 to clause 15, additionally comprising (3) at least one of (3)(a) a chain extender, (3)(b) a crosslinking agent, or (3)(c) a foam modifier or foam processing aid.

Clause 24. The isocyanate-reactive component of clause 23, wherein (3)(c) the foam modifier or foam processing aid has a hydroxyl number of at least 300, or of at least 600.

Clause 25. A process of preparing the viscoelastic flexible polyurethane foams which comprises reacting: (A) a diisocyanate and/or polyisocyanate component, with (B) an isocyanate-reactive component which comprises: (1) the in-situ formed polyol blend of one of clause 1 to clause 15, in the presence of: (C) a blowing agent; (D) a catalyst; and (E) a surfactant.

Clause 26. The process of clause 25, wherein (B) the isocyanate-reactive component comprises the isocyanate-reactive component of one of clause 20 to clause 24.

Clause 27. The process of one of clause 25 to clause 26, wherein (A) the diisocyanate component comprises toluene diisocyanate.

Clause 28. The process of one of clause 25 to clause 27, wherein (C) the blowing agent comprises water.

Clause 29. The process of one of clause 25 to clause 28, wherein (C) is present in an amount of 0.5 to 20% by weight, based on 100% by weight of (B) the isocyanate-reactive component.

Clause 30. The process of one of clause 25 to clause 29, wherein (D) the surfactant comprises a silicone surfactant.

Clause 31. The process of one of clause 25 to clause 30, wherein (D) the surfactant is present in an amount of 0.1 to 4% by weight, based on 100% by weight of (B) the isocyanate-reactive component.

Clause 32. The process of one of clause 25 to clause 31, wherein (E) the catalyst comprises at least one of an organotin catalyst, and an organoamine catalyst.

Clause 33. The process of one of clause 25 to clause 32, wherein (E) the catalyst is present in an amount of 0.01 to 3% by weight, based on 100% by weight of (B) the isocyanate-reactive component.

Clause 34. A viscoelastic flexible polyurethane foam comprising the reaction product of (A) a diisocyanate and/or polyisocyanate component, with (B) an isocyanate-reactive component comprising (1) the in-situ formed polyol blend of one of clause 1 to clause 15, in the presence of (C) a blowing agent, (D) a catalyst, and (E) a surfactant.

Clause 35. The viscoelastic foam of clause 34, wherein (B) the isocyanate-reactive component comprises the isocyanate-reactive component of one of clause 20 to clause 24.

Clause 36. The viscoelastic foam of one of clause 34 to clause 35, wherein (A) the diisocyanate component comprises toluene diisocyanate.

Clause 37. The viscoelastic foam of one of clause 34 to clause 36, wherein (C) the blowing agent comprises water.

Clause 38. The viscoelastic foam of one of clause 34 to clause 37, wherein (C) is present in an amount of 0.5 to 20% by weight, based on 100% by weight of (B) the isocyanate-reactive component.

Clause 39. The viscoelastic foam of one of clause 34 to clause 38, wherein (D) the surfactant comprises a silicone surfactant.

Clause 40. The viscoelastic foam of one of clause 34 to clause 39, wherein (D) the surfactant is present in an amount of 0.1 to 4% by weight, based on 100% by weight of (B) the isocyanate-reactive component.

Clause 41. The viscoelastic foam of one of clause 34 to clause 40, wherein (E) the catalyst comprises at least one of an organotin catalyst, and an organoamine catalyst.

Clause 42 The viscoelastic foam of one of clause 34 to clause 41, wherein (E) the catalyst is present in an amount of 0.01 to 3% by weight, based on 100% by weight of (B) the isocyanate-reactive component.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Test Methods: The physical properties reported herein were measured per the standard procedures described in ASTM D3574-17 having the title "Standard Test Methods for Flexible Cellular Materials—Slab, Bonded, and Molded Urethane Foams" unless otherwise stated.

Hydroxyl Numbers: The hydroxyl numbers were determined in accordance with ASTM D-4274-11, and are reported in mg KOH/g polyol.

Viscosity: The viscosities of the polyether polyols were determined at 25° C. using an Anton Paar SVM 3000/G2 Stabinger Viscometer.

Other foam physical properties reported herein were measured per the standard procedures described in ASTM D3574-17.

As used herein, "pphp" represents parts per hundred parts polyol.

The following materials were used in the working examples:

Polyol A: An in-situ formed multifunctional polyol prepared by alkoxylating a monol, diol, and triol with a DMC catalyst following the procedure described in U.S. Pat. No. 6,491,846. The starter comprises a 1600 MW (35 OH #) monol made from the propoxylation of Neodol 25. 3390 g of this 1600 MW monol are alkoxylated with 3287 g of a mixture of propylene oxide and ethylene oxide in a weight ratio of 82/18 to a hydroxyl number of about 17.8 mg KOH/g. The alkoxide mixture was charged at a combined feed rate of 60.26 g/min. The resulting 17.8 hydroxyl number monol contains a total of 8.5% ethylene oxide. Next, a mixture of 1107 g glycerin and propylene glycol in a 62.3 to 37.7 wt % ratio was continuously added at a combined feed rate of 7.91 g/m in along with mixture of 8437 g propylene oxide and ethylene oxide in a weight ratio of 82/18 until a hydroxyl number of about 123 was reached. The alkoxide mixture was charged at a combined feed rate of 60.26 g/min. At this point, the propylene glycol and glycerin feeds were stopped and an additional 441 g of the propylene oxide and ethylene oxide mixture were continuously added until a hydroxyl number of about 120 was reached. At this point the reactor contains a mixture of the previously mentioned 17.8 hydroxyl number monol, a diol intermediate with a hydroxyl number of 187 mg KOH/g and a triol intermediate with a hydroxyl number of 187 mg KOH/g. At this point 3333 g of a mixture of propylene oxide and ethylene oxide were continuously added in a weight ratio of 55/45 at a combined feed rate of 60.26 g/min until the hydroxyl number of the diol and triol components reached about 140 mg KOH/g. The diol and triol components each contain a total of 23% ethylene oxide with 12% ethylene oxide in the internal block and 11% ethylene oxide in the external block. This in-situ formed polyol blend contains 33 weight % monol, 22 weight % diol and 45 weight % triol. The in-situ formed polyol blend had an overall functionality of about 2.4, total ethylene oxide content of 18.5% and an overall hydroxyl number of about 100.

Polyol B: An in-situ formed multifunctional polyol blend prepared by first alkoxylating a monol, diol, and triol with a DMC catalyst following the procedure described in U.S. Pat. No. 6,491,846 and then alkoxylating a triol. The starter comprised a 1600 MW (35 OH #) monol made from the propoxylation of Neodol 25. 3030 g of this 1600 MW monol are alkoxylated with 2938 g of a mixture of propylene oxide and ethylene oxide in a weight ratio of 82/18, respectively, to a hydroxyl number of about 17.8 mg KOH/g. The alkoxide mixture was charged at a combined feed rate of 61.56 g/min. The resulting 17.8 hydroxyl number monol contains a total of 8.5% ethylene oxide. Next, a mixture of 984 g glycerin and propylene glycol in a 62.2 to 37.8 wt % ratio was continuously added at a combined feed rate of 8.05 g/min along with mixture of 7523 g propylene oxide and ethylene oxide in a weight ratio of 82/18 until a hydroxyl number of about 123 was reached. The alkoxide mixture was charged at a combined feed rate of 61.56 g/min. At this point, the propylene glycol and glycerin feeds were stopped and an additional 396 g of the propylene oxide and ethylene oxide mixture were continuously added until a hydroxyl number of about 120 was reached. At this point the reactor contains a mixture of the previously mentioned 17.8 hydroxyl number monol, a diol intermediate with a hydroxyl number of 187 mg KOH/g and a triol intermediate with a hydroxyl number of 187 mg KOH/g. At this point 2975 g of a mixture of propylene oxide and ethylene oxide were continuously added in a weight ratio of 55/45 at a combined feed rate of 61.56 g/min until the hydroxyl number of the diol and triol components reached about 140 mg KOH/g. The diol and triol components each contain a total of 23% ethylene oxide with 12% ethylene oxide in the internal block and 11% ethylene oxide in the external block. After this the ethylene oxide feed was stopped and 1784 g of propylene oxide and 168 g of glycerin were then continuously added at feed rates of 61.56 and 5.79 g/min respectively, until the hydroxyl number of the triol propoxylate reached about 149 mg KOH/g. After this the glycerin feed was stopped and an additional 198 g of propylene oxide was continuously added until a hydroxyl number of about 140 was reached for the triol propoxylate. This in-situ formed polyol blend now contains 30 weight % of a monol containing 8.5% ethylene oxide, 19 weight % of a diol containing 23% ethylene oxide, 40 weight % of a triol containing 23% ethylene oxide and 11% of a triol propoxylate. The in-situ formed polyol blend had an overall functionality of about 2.4, total ethylene oxide content of about 16.4% and an overall hydroxyl number of about 104.

Polyol C: An in-situ formed multifunctional polyol blend prepared by first alkoxylating a monol, diol, and triol with a DMC catalyst following the procedure described in U.S. Pat. No. 6,491,846. The starter comprises a 1600 MW (35 OH #) monol made from the propoxylation of Neodol 25. 3030 g of this 1600 MW monol are alkoxylated with 2939 g of a mixture of propylene oxide and ethylene oxide in a weight ratio of 85/15, respectively, to a hydroxyl number of about 17.8 mg KOH/g. The alkoxide mixture was charged at a combined feed rate of 61.56 g/min. The resulting 17.8 hydroxyl number monol contains a total of 8.5% ethylene oxide. Next, a mixture of 1152 g glycerin and propylene glycol in a 67.7 to 32.3 wt % ratio was continuously added at a combined feed rate of 7.54 g/min along with mixture of 9408 g propylene oxide and ethylene oxide in a weight ratio of 85/15 until a hydroxyl number of about 126 was reached. The alkoxide mixture was charged at a combined feed rate of 61.56 g/min. At this point, the propylene glycol and glycerin feeds were stopped and an additional 495 g of the propylene oxide and ethylene oxide mixture were continuously added until a hydroxyl number of about 123 was reached. At this point the reactor contains a mixture of the previously mentioned 17.8 hydroxyl number monol, a diol intermediate with a hydroxyl number of 187 mg KOH/g and a triol intermediate with a hydroxyl number of 187 mg KOH/g. At this point 2976 g of a mixture of propylene oxide and ethylene oxide were continuously added in a weight ratio of 55/45 at a combined feed rate of 61.56 g/min until the hydroxyl number of the diol and triol components reached about 140 mg KOH/g. The diol and triol components each contain a total of 20% ethylene oxide with 10.5% ethylene oxide in the internal block and 9.5% ethylene oxide in the external block. This in-situ formed polyol blend contains 30 weight % monol, 19 weight % diol and 51 weight % triol. The in-situ formed polyol blend had an overall functionality of about 2.4, total ethylene oxide content of 16.4% and an overall hydroxyl number of about 103.

Polyol D: A glycerin started poly(oxypropyleneoxyethylene) polyol having a hydroxyl number of about 37, and containing about 73% of copolymerized oxyethylene Polyol E: A glycerin starter poly(oxypropylene) polyol having a hydroxyl number of about 168

Foam Modifier A: A foam modifier having a hydroxyl number of about 1240 mg KOH/g polyol, commercially available from Momentive Performance Materials as Arcol DP-1022

Foam Modifier B: A delayed action crosslinking agent available from Evonik Industries as Ortegol 204

Surfactant A: A silicone surfactant commercially available from Momentive

Performance Materials as Niax L-618

Catayst A: An amine catalyst, commercially available from Momentive Performance Materials as Niax A-33

Catalyst B: An amine catalyst, commercially available from Momentive Performance Materials as Niax A-1

Catalyst C: Tin octoate, commercially available from Evonik as Dabco T-9

Isocyanate A: Toluene diisocyanate having 80% of the 2,4 isomer and 20% of the 2,6 isomer The free-rise bench scale foams of Table 1 were prepared using the following procedure. The polyols, water, silicone surfactants, amine catalysts, and any other non-isocyanate additives were added to a cylindrical container fitted with baffles. The contents were mixed at 2400 rpm for 60 seconds with an agitator having two turbine impellers. Tin Catalyst C, if employed, was added at this time. The mixture was then degassed for 15 seconds. After degassing, the contents were mixed at 2400 rpm for 15 seconds, during which period the isocyanate was added when about 10 seconds of mixing time remained. The mixture was then poured into a 14×14×6-inch cardboard box, where it rose freely until the reaction was complete. A batch size sufficient to give a bun at least about 6 inches high was employed. The freshly prepared bun was cured for 20 minutes in an oven at 120° C. and then allowed to cure at ambient conditions for a minimum of 1 day. Observations made during foaming and curing are set forth in the Tables. The buns were then trimmed to 12×12×4 inches and were roller crushed 3 times to a minimum thickness of about 0.5 inches. These samples were then conditioned for at least 16 hours at standard temperature (~23° C.) and humidity (~50%) before being tested.

TABLE 1

Foam Formulations

|  | Example 1 (control) | Example 2 | Example 3 |
|---|---|---|---|
| Isocyanate-Reactive Component | | | |
| Polyol A | 83.00 | | |
| Polyol B | | 93.00 | |
| Polyol C | | | 93.00 |
| Polyol D | 7.00 | 7.00 | 7.00 |
| Polyol E | 10.00 | | |
| Surfactant A | 0.80 | 0.80 | 0.80 |
| Foam Modifier A | 1.50 | 1.50 | 1.50 |
| Foam Modifier B | 0.60 | 0.60 | 0.60 |
| Water (distilled) | 1.10 | 1.10 | 1.10 |
| Catalyst A | 0.58 | 0.58 | 0.58 |
| Catalyst B | 0.07 | 0.07 | 0.07 |
| Catalyst C | 0.03 | 0.03 | 0.03 |
| A-Side (Isocyanate) | | | |
| Isocyanate A | 31.93 | 31.68 | 31.54 |
| Isocyanate Index | 100.00 | 100.00 | 100.00 |

TABLE 2

Foam Properties

| Physical Properties | Units | Example 1 | Example 2 | Example 3 |
|---|---|---|---|---|
| Actual Density | kg/m³ (lb/ft³) | 61.4 (3.83) | 60.4 (3.77) | 60.7 (3.79) |
| Airflow | m³/min (ft³/min) | 0.153 (5.41) | 0.139 (4.92) | 0.137 (4.85) |
| IFD 25% | N (lbf) | 43.1 (9.70) | 45.6 (10.26) | 50.4 (11.32) |
| IFD 65% | N (lbf) | 98.1 (22.07) | 102.2 (22.97) | 110.9 (24.94) |
| IFD 25% Return | N (lbf) | 40.1 (9.03) | 42.2 (9.49) | 46.9 (10.55) |
| Return Val. 25% | % | 93.03 | 92.5 | 93.25 |
| S.F. 65%/25% | NA | 2.27 | 2.24 | 2.2 |
| Tensile Strength | kPa (psi) | 72.59 (10.53) | 73.56 (10.67) | 60.63 (8.78) |
| Elongation | % | 253.43 | 251.3 | 231.3 |
| Tear Strength | N/m (pli) | 196.2 (1.12) | 187.4 (1.07) | 189.1 (1.08) |
| 75% Compression Set | % | 1.40 | 1.52 | 1.52 |
| 90% Compression Set | % | 1.70 | 1.9 | 1.97 |
| 75% HACS | % | 1.78 | 1.63 | 1.76 |
| Resilience (Ball Rebound) | % | 1.47 | 1.0 | 3.8 |
| 50% Wet Set | % | 0.52 | 0.65 | 0.69 |
| 75% Wet Set | % | 0.37 | 0.65 | 0.68 |
| 90% Wet Set | % | 0.22 | 0.33 | 0.69 |
| Visco Recovery | Sec | 4.59 | 4.52 | ND* |

*ND—Not Determined

Example 1 is a control of a blended polyol which is not made in-situ. Example 2 is representative of the invention. Example 3 is a comparative example.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An in-situ formed polyol blend having an overall functionality of 2 to 3, an overall hydroxyl number of 50 to 150, and comprising:
   (a) a monol initiated oxyalkylene ether having a hydroxyl number of less than or equal to 56 mg KOH/g polyol, and containing less than or equal to 20% of copolymerized oxyethylene, based on the total weight of monol initiated oxyalkylene ether (a);
   (b) a polyether polyol having a hydroxyl number of 80 mg KOH/g polyol to 220 mg KOH/g polyol, a nominal functionality of 2, and containing from 5 to 45% of copolymerized oxyethylene, based on the total weight of polyether polyol (b);
   (c) a polyether polyol having a hydroxyl number of 80 mg KOH/g polyol to 220 mg KOH/g polyol, a nominal functionality of greater than 2 to 8, and containing from 5 to 45% of copolymerized oxyethylene, based on the total weight of polyether polyol (c); and
   (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
   wherein (a) said in-situ formed polyol blend comprises from 10 to 40% by weight of said monol initiated oxyalkylene ether (a), from 10 to 30% by weight of said polyether polyol (b), from 20 to 65% by weight of said polyether polyol (c), and from 5 to 20% by weight of said polyether polyol (d), with the sum of the %'s by weight of (a), (b), (c) and (d) totaling 100% by weight of said in-situ formed polyol blend.

2. The in-situ formed polyol blend of claim 1, wherein (d) the polyether polyol has a nominal functionality of 3 to 8 and a hydroxyl number of 100 to 180.

3. The in-situ formed polyol blend of claim 1, wherein the monol initiated oxyalkylene ether (a) comprises an oxypropylene block next to a low equivalent weight monofunctional starter residue followed by a terminal mixed oxyalkylene block which comprises copolymerized oxypropylene and copolymerized oxyethylene.

4. The in-situ formed polyol blend of claim 3, wherein the terminal mixed oxyalkylene block which comprises copolymerized oxypropylene and copolymerized oxyethylene contains at most 20% by weight copolymerized oxyethylene, based on 100% by weight of the terminal mixed oxyalkylene block.

5. The in-situ formed polyol blend of claim 1, wherein the polyether polyol (b) has a mixed oxyalkylene block which comprises copolymerized oxypropylene and copolymerized oxyethylene containing at most 20% by weight copolymerized oxyethylene, based on 100% by weight of the mixed oxyalkylene block, which is followed by a second mixed oxyalkylene block which comprises copolymerized oxypropylene and copolymerized oxyethylene containing at least 40% by weight of copolymerized oxyethylene, based on 100% by weight of the second mixed oxyalkylene block.

6. The in-situ formed polyol blend of claim 1, wherein the polyether polyol (c) has a mixed oxyalkylene block which comprises copolymerized oxypropylene and copolymerized oxyethylene containing at most 20% by weight copolymerized oxyethylene, based on 100% by weight of the mixed oxyalkylene block, which is followed by a second mixed oxyalkylene block which comprises copolymerized oxypropylene and copolymerized oxyethylene containing at least 40% by weight of copolymerized oxyethylene, based on 100% by weight of the second mixed oxyalkylene block.

7. The in-situ formed polyol blend of claim 1, which comprises from 25 to 35% by weight of said monol initiated oxyalkylene ether (a); from 15 to 25% of said polyether polyol (b); from 30 to 55% by weight of said polyether polyol (c); and from 5 to 15% by weight of said polyether polyol (d), with the sum of the %'s by weight of (a), (b), (c) and (d) totaling 100% by weight of the in-situ formed polyol blend.

8. A process of preparing the in-situ formed polyol blend having an overall functionality of 2 to 3, and an overall hydroxyl number of 50 to 150, comprising:
I) introducing into a reaction vessel a mixture comprising:
  (1) an initially charged starter ($S_i$) comprising a monofunctional compound having a hydroxyl number of less than or equal to 80, and
  (2) a double metal cyanide (DMC) catalyst;
II) feeding
  (1) an epoxide comprising propylene oxide and ethylene oxide in a weight ratio of 100:0 to 80:20, into the reaction vessel;
III) allowing the epoxide and the initially charged starter ($S_i$) to react and to polymerize by feeding the epoxide until the equivalent weight of the monofunctional compound is increased by at least 10% by weight and reaches a value between 1,500 and 6,000;
IV) continuously adding
  (1) a low equivalent weight continuously added starter ($S_c$) having a nominal functionality of greater than 2 to 6, and an equivalent weight of 28 to 400 into the reaction vessel while continuing to feed epoxide;
V) completing addition of the continuously added starter ($S_c$);
VI) allowing polymerization to continue in the reaction vessel thereby forming
  (1) an intermediate in-situ formed polyol blend which has an overall hydroxyl number of 50 to 150, an overall functionality of 2 to 3, and which comprises
    (a) a monol initiated oxyalkylene ether having a hydroxyl number of less than or equal to 56, and containing less than or equal to 20% by weight of copolymerized oxyethylene, based on 100% by weight of (a),
    (b) a polyether polyol having a hydroxyl number of 80 to 220, a nominal functionality of 2 and containing from 5 to 45% by weight of copolymerized oxyethylene, based on the total weight of the polyether polyol (b), and
    (c) a polyether polyol having a hydroxyl number of 80 to 220, a nominal functionality of greater than 2 to 8, and containing from 5 to 45% by weight of copolymerized oxyethylene, based on the total weight of the polyether polyol (c);
VII) feeding
  (1) an epoxide comprising propylene oxide while continuously adding
  (2) a low equivalent weight continuously added starter ($S_c$) having a nominal functionality of 2 to 8, and an equivalent weight of 28 to 400 into the reaction vessel;
VIII) completing addition of the continuously added starter ($S_c$) and epoxide thereby forming in addition to (a), (b) and (c);
  (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
wherein said in-situ formed polyol blend comprises from 10 to 40% by weight of said monol initiated oxyalkylene ether (a), from 10 to 30% by weight of said polyether polyol (b), from 20 to 65% by weight of said polyether polyol (c), and from 5 to 20% by weight of said polyether polyol (d), with the sum of the %'s by weight of (a), (b), (c) and (d) totaling 100% by weight of said in-situ formed polyol blend.

9. The process of claim 8, wherein the monol initiated oxyalkylene ether (a) comprises an oxypropylene block next to a residue of the initially charged starter ($S_i$) followed by a terminal mixed oxyalkylene block which comprises copolymerized oxypropylene and copolymerized oxyethylene.

10. The process of claim 9, wherein the terminal mixed oxyalkylene block which comprises copolymerized oxypropylene and copolymerized oxyethylene contains at most 20% by weight copolymerized oxyethylene, based on 100% by weight of the terminal mixed oxyalkylene block.

11. The process of claim 8, wherein the polyether polyol (b) has a mixed oxyalkylene block which comprises copolymerized oxypropylene and copolymerized oxyethylene containing at most 20% by weight of copolymerized oxyethylene, based on 100% by weight of the mixed oxyalkylene block, which is followed by a second mixed oxyalkylene block which comprises copolymerized oxypropylene and copolymerized oxyethylene containing at least 40% by weight of copolymerized oxyethylene, based on 100% by weight of the second mixed oxyalkylene block.

12. The process of claim 8, wherein the polyether polyol (c) has a mixed oxyalkylene block which comprises copolymerized oxypropylene and copolymerized oxyethylene containing at most 20% by weight of copolymerized oxyethylene, based on 100% by weight of the mixed oxyalkylene block, which is followed by a second mixed oxyalkylene block which comprises copolymerized oxypropylene and copolymerized oxyethylene containing at least 40% by weight of copolymerized oxyethylene, based on 100% by weight of the second mixed oxyalkylene block.

13. The process of claim 8, wherein said initially charged starter ($S_i$) has a hydroxyl number of less than 56.

14. The process of claim 8, wherein said initially charged starter ($S_i$) comprises a monol initiated oxyalkylene ether which comprises the reaction product of a monofunctional starter and an epoxide.

15. The process of claim 8, wherein said in-situ formed polyol blend comprises from 25 to 35% by weight of said monol initiated oxyalkylene ether (a); from 15 to 25% of said polyether polyol (b); from 30 to 55% by weight of said polyether polyol (c); and from 5 to 15% by weight of said polyether polyol (d), with the sum of the %'s by weight of (a), (b), (c) and (d) totaling 100% by weight of said in-situ formed polyol blend.

16. An isocyanate-reactive component comprising (1) said in-situ formed polyol blend of claim 1, and (2) at least one of (2)(a) a polyether polyol having a hydroxyl number of 20 to 240, an average functionality of 2 to 8, and containing at least 50% of copolymerized oxyethylene, based on 100% by weight of component (2)(a), and (2)(b) a filled polyol.

17. The isocyanate-reactive component of claim 12, additionally comprising (3) at least one of (3)(a) a chain extender, (3)(b) a crosslinking agent, and (3)(c) a foam modifier or a foam processing aid.

18. A viscoelastic flexible polyurethane foam comprising the reaction product of:
(A) a diisocyanate and/or polyisocyanate component,
(B) an isocyanate-reactive component comprising:
  (1) an in-situ formed polyol blend having an overall functionality of 2 to 3, an overall hydroxyl number of 50 to 150, which comprises:
    (a) a monol initiated oxyalkylene ether having a hydroxyl number of less than or equal to 56, and containing less than or equal to 20% by weight of copolymerized oxyethylene, based on the total weight of monol initiated oxyalkylene ether (a),
    (b) a polyether polyol having a hydroxyl number of 80 to 220, a nominal functionality of 2, and containing from 5 to 45% by weight of copolymerized oxyethylene, based on the total weight of polyether polyol (b),
    (c) a polyether polyol having a hydroxyl number of 80 to 220, a nominal functionality of greater than 2 to 8, and containing from 5 to 45% by weight of copolymerized oxyethylene, based on the total weight of polyether polyol (c), and
    (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
    wherein said in-situ formed polyol blend comprises from 10 to 40% by weight of said monol initiated oxyalkylene ether (a), from 10 to 30% by weight of said polyether polyol (b), from 20 to 65% by weight of polyether polyol (c), and from 5 to 20% by weight of polyether polyol (d), with the sum of the %'s by weight of (a), (b), (c) and (d) totaling 100% by weight of said in-situ formed polyol blend;
in the presence of:
(C) a blowing agent;
(D) a catalyst; and
(E) a surfactant.

19. A process of preparing a viscoelastic flexible polyurethane foam comprising reacting:
(A) a diisocyanate and/or polyisocyanate component, with
(B) an isocyanate-reactive component comprising:
  (1) an in-situ formed polyol blend having an overall functionality of 2 to 3, an overall hydroxyl number of 50 to 150, which comprises:
    (a) a monol initiated oxyalkylene ether having a hydroxyl number of less than or equal to 56, and containing less than or equal to 20% by weight of copolymerized oxyethylene, based on the total weight of monol initiated oxyalkylene ether (a),
    (b) a polyether polyol having a hydroxyl number of 80 to 220, a nominal functionality of 2, and containing from 5 to 45% by weight of copolymerized oxyethylene, based on the total weight of polyether polyol (b),
    (c) a polyether polyol having a hydroxyl number of 80 to 220, a nominal functionality of greater than 2 to 8, and containing from 5 to 45% by weight of copolymerized oxyethylene, based on the total weight of polyether polyol (c), and
    (d) a polyether polyol having a hydroxyl number of 80 to 220 mg KOH/g polyol, a nominal functionality of 2 to 8, and containing 100% of polyoxypropylene, based on the total weight of polyoxyalkylene in polyether polyol (d);
    wherein said in-situ formed polyol blend comprises from 10 to 40% by weight of said monol initiated oxyalkylene ether (a), from 10 to 30% by weight of said polyether polyol (b), from 20 to 65% by weight of said polyether polyol (c), and from 5 to 20% by weight of said polyether polyol (d), with the sum of the %'s by weight of (a), (b), (c) and (d) totaling 100% by weight of said in-situ formed polyol blend;
in the presence of:
(C) a blowing agent;
(D) a catalyst; and
(E) a surfactant.

* * * * *